United States Patent [19]

Redzinski

[11] 4,148,231
[45] Apr. 10, 1979

[54] AUTOMATIC TRANSMISSION CONTROL
[75] Inventor: Gilbert E. Redzinski, Niles, Mich.
[73] Assignee: Clark Equipment Company, Buchanan, Mich.
[21] Appl. No.: 790,218
[22] Filed: Apr. 25, 1977
[51] Int. Cl.² ............................................. B60K 41/06
[52] U.S. Cl. ..................................................... 74/866
[58] Field of Search ........................................ 74/866
[56] References Cited
U.S. PATENT DOCUMENTS
3,961,546  6/1976  Gilmore et al. ......................... 74/866

Primary Examiner—Samuel Scott
Assistant Examiner—Frank H. McKenzie, Jr.
Attorney, Agent, or Firm—Reising, Ethington, Barnard, Perry & Brooks

[57] ABSTRACT

An electronic digital control system is disclosed for vehicle power transmissions, especially adapted for off-highway earth moving vehicles. Automatic forward speed range shifting is provided in response to the vehicle speed subject to certain overriding manual control. A transmission output speed signal is applied to a shift signal generating means which has a plurality of channels each corresponding to a different forward speed range. A level detecting means in each channel produces digital upshift and downshift signals and shift signal counting means, connected with all channels, produces a net count of upshift and downshift signal events and a command signal representing the speed range into which the transmission is to be shifted. A shift control circuit responds to the command signal to effect the required ratio change in the transmission. Feedback means are provided from the counting means to the shift signal generating means to ensure that a shift signal event will not be produced for any speed range except those immediately higher or lower than the existing speed range. A manual range selector switch inhibits the automatic system from shifting to a speed range higher than that selected by the operator. The system includes means for causing lock-up of the torque converter in a predetermined speed range and for momentary unlock of the converter during shifting of the transmission. Manual control functions including reverse drive, neutral and low-low drive are provided in the control system.

29 Claims, 20 Drawing Figures

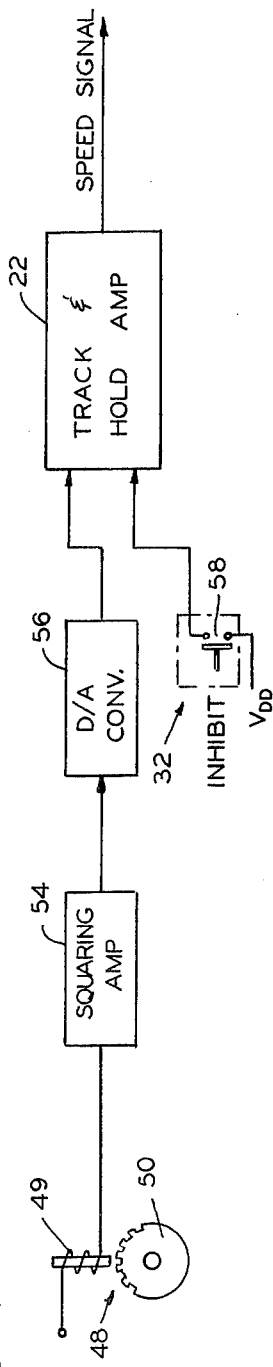
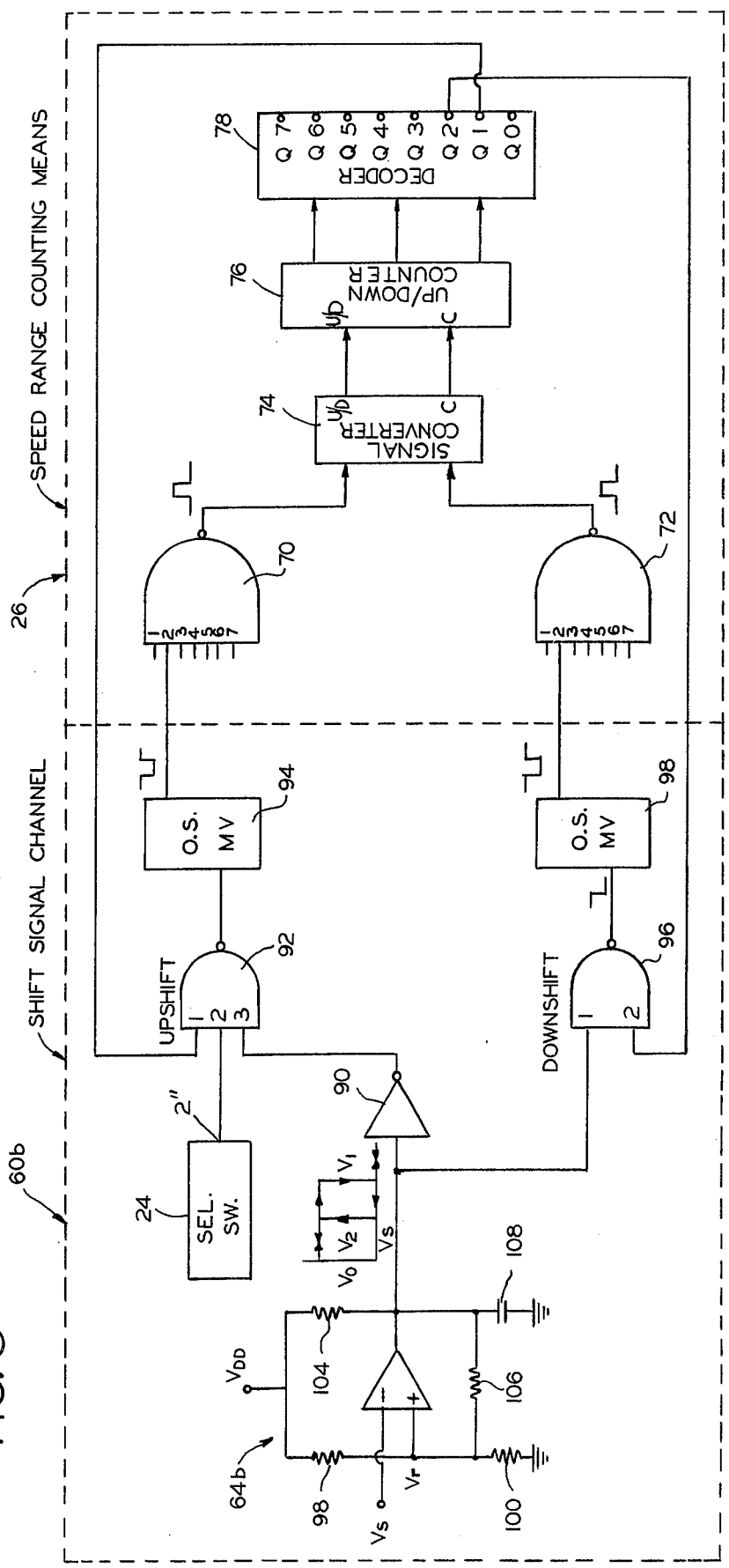

FIG. 10

| TRANSMISSION RANGE SELECTION | DECODER OUTPUT | | | | | | | | SOLENOIDS* | | | |
|---|---|---|---|---|---|---|---|---|---|---|---|---|
| | Q0 | Q1 | Q2 | Q3 | Q4 | Q5 | Q6 | Q7 | 51' | 52' | 53' | SPLITTER |
| 1 | — | O | O | O | O | O | O | O | X | X | X | O |
| 2 | O | — | O | O | O | O | O | O | X | X | X | X |
| 3 | O | O | — | O | O | O | O | O | O | X | X | O |
| 4 | O | O | O | — | O | O | O | O | O | X | X | X |
| 5 | O | O | O | O | — | O | O | O | O | O | X | O |
| 6 | O | O | O | O | O | — | O | O | O | O | X | X |
| 7 | O | O | O | O | O | O | — | O | O | O | O | O |
| 8 | O | O | O | O | O | O | O | — | O | O | O | X |

\* X = ENERGIZED  O = DEENERGIZED

FIG. 11

| TRANSMISSION RANGE | DECODER OUTPUT | | | | | | | | FLIP-FLOP 116 | | | FLIP-FLOP 130 | | | FLIP-FLOP 138 | | |
|---|---|---|---|---|---|---|---|---|---|---|---|---|---|---|---|---|---|
| | Q0 | Q1 | Q2 | Q3 | Q4 | Q5 | Q6 | Q7 | S | R | Q | S | R | Q | S | R | Q |
| 1st | — | O | O | O | O | O | O | O | O | O | — | O | O | — | O | O | — |
| 2nd | O | — | O | O | O | O | O | O | — | O | O | O | O | — | O | O | — |
| 3rd | O | O | — | O | O | O | O | O | O | — | O | O | O | — | O | O | — |
| 4th | O | O | O | — | O | O | O | O | — | O | O | — | O | O | O | O | — |
| 5th | O | O | O | O | — | O | O | O | O | — | O | O | — | O | O | O | — |
| 4th | O | O | O | — | O | O | O | O | — | O | O | O | — | O | O | O | — |
| 3rd | O | O | — | O | O | O | O | O | O | — | O | O | O | — | O | O | — |
| 2nd | O | — | O | O | O | O | O | O | — | O | O | O | O | — | O | O | — |
| 1st | — | O | O | O | O | O | O | O | O | O | — | O | O | — | O | O | — |

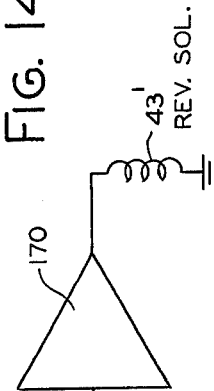
Fig. 15
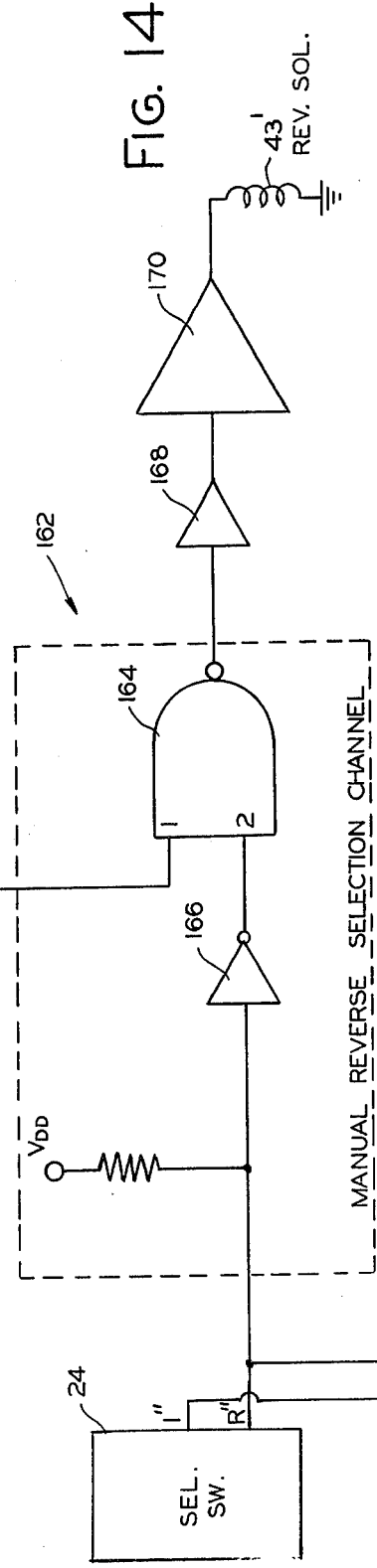
Fig. 14
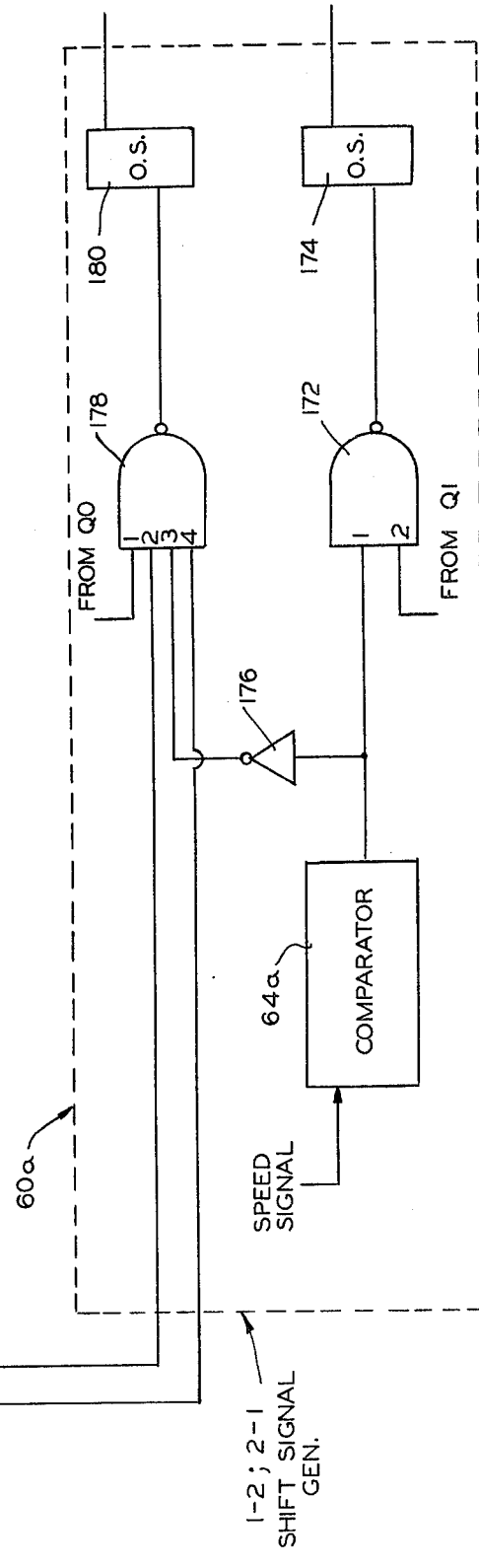

| TRUTH TABLE | | | | | | |
|---|---|---|---|---|---|---|
| CAB CONTROL (SEL. SW.) | N" OUTPUT | INVERT BUFFER 194 | DECODER OUTPUT (Q0) | NAND 188 OUTPUT | NON-INV. BUFFER 190 | AMP 192 | NEUTRAL SOL. | TRANS- MISSION |
| IN NEUTRAL | 0 | 1 | 1 | 0 | 0 | 0 | OFF | IN NEUTRAL |
| OUT OF NEUTRAL | 0 | 0 | 1 | 1 | 1 | 1 | ON | OUT OF NEUTRAL |

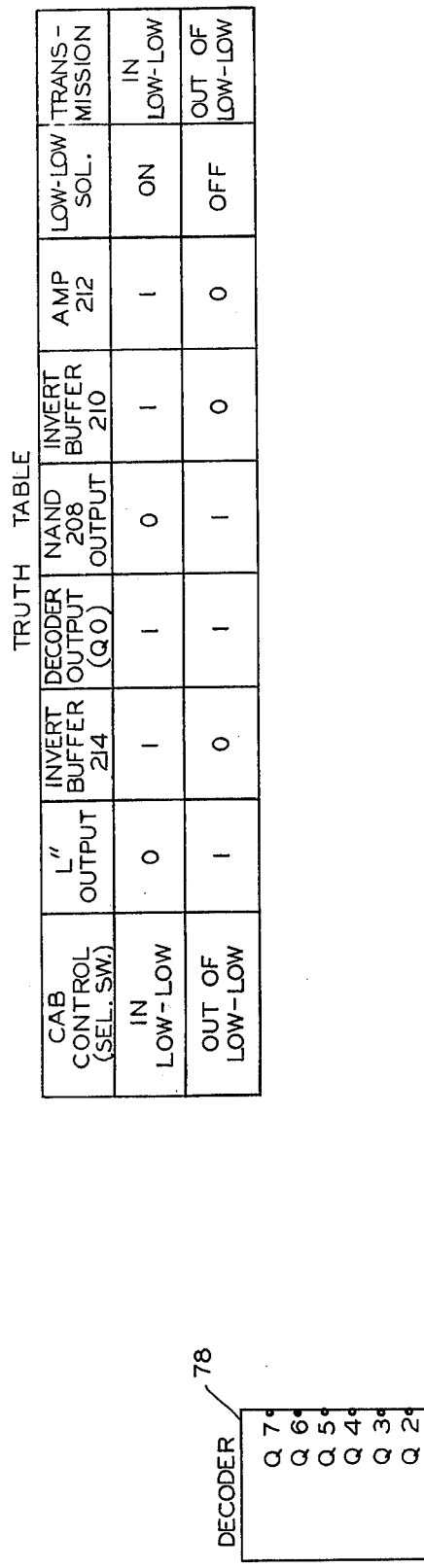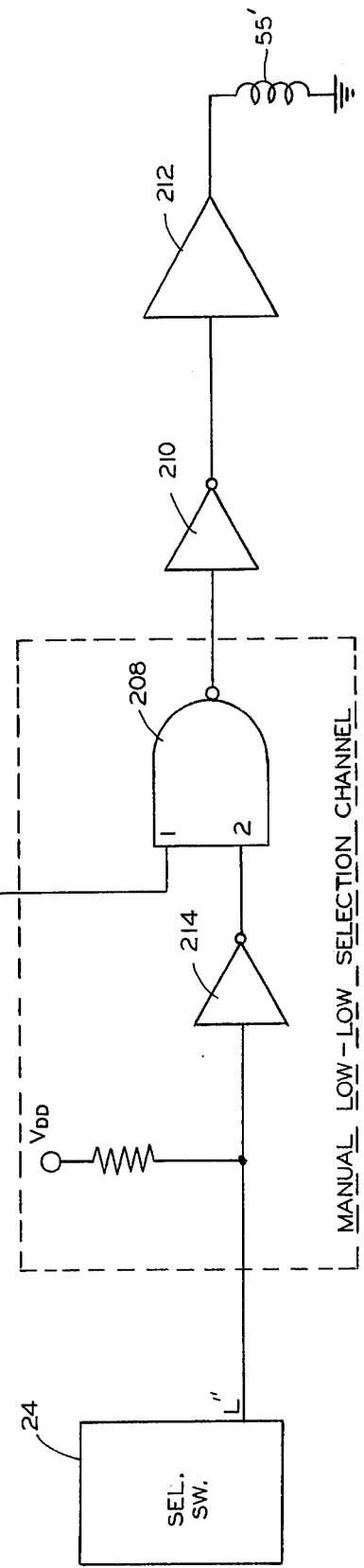

ND CONTROL

FIELD OF THE INVENTION

This invention relates to automatic control systems for vehicle power transmissions; more particularly, it relates to electronic control systems for such transmissions.

BACKGROUND OF THE INVENTION

Vehicle transmissions with manually operated electrical remote control of gear shifting are well known, especially for off-road earth moving vehicles and the like. An electrical remote shift system offers several advantages such as eliminating complicated control linkages and enhancing vehicle design flexibility. There is a need, however, to provide automatic shifting in order to optimize the machine performance and to reduce the demands on the human operator. In the prior art, automatic transmission control systems have been proposed in which an electronic control system controls the shifting in response to selected operating parameters of the vehicle.

The Nelson U.S. Pat. No. 3,448,640 discloses an automatic transmission control system in which the shift points are a function of throttle position and transmission output speed. The system of this patent includes a plurality of speed range channels which receive input signals from a manual selector switch. A gate means or comparator in each channel compares a throttle position signal and a speed signal and when a predetermined relationship occurs the gate is enabled and an output is produced to call for the shift of the transmission ratio. The comparator is described as being enabled by a certain relation of the throttle signal and speed signal and when it is enabled the selector signal is gated through the comparator to an output terminal.

Schneider et al U.S. Pat. No. 3,805,604 discloses an automatic transmission control system in which a shift signal is produced by comparison of a vehicle speed signal with a plurality of speed reference signals. The vehicle speed signal is applied to one input of each of a plurality of "speed switches" which are operational amplifiers, each having adjustable set points corresponding to desired speed ranges. The set points are modified in accordance with throttle position. Further, the operational amplifiers are provided with switching hysteresis to separate the upshift and downshift points. The outputs of the operational amplifiers or speed switches are applied through a logic circuit which controls the solenoid valves for selecting the gear range.

The Ito et al U.S. Pat. No. 3,750,495 patent discloses a digital control system for automatic transmissions with provisions of means to alleviate shock during the shift from one gear to another. A logic circuit determines the shift points as a function of throttle position and speed. Means are provided for controlling the pressure to the planetary gear clutches during the gear changes. Wakamatsu et al U.S. Pat. No. 3,724,293, Ito et al U.S. Pat. No. 3,646,835, and Shimwell et al U.S. Pat. No. 3,122,940 are all directed to electronic transmission control systems in which the transmission shift points are controlled as a function of both vehicle speed and torque demand on the engine. They also include manual gear selector controls providing an input to the electronic system.

SUMMARY OF THE INVENTION

This invention provides an improved electronic control system which automatically controls the shifting of a transmission to obtain the most effective performance of the vehicle while minimizing the demands on the human operator. This is accomplished by a control circuit which includes a shift signal generator responsive to a vehicle speed signal for generating a succession of shift signal events at successively different vehicle speeds; the shift signal events are counted to produce a command signal which controls the shifting of the transmission and which is fed back to the shift signal generator to control the generation of shift signal events.

Further, in accordance with this invention, a transmission control system is provided which comprises a shift signal generating means including a plurality of shift signal channels corresponding to a plurality of different speed ranges with each channel including level detecting means. A speed signal corresponding to the speed of the vehicle is applied to each of the level detecting means. Each level detecting means produces a logic signal which changes state in one sense at an upshift point and in the opposite sense at a downshift point. An upshift signal circuit and a downshift signal circuit are connected with said level detecting means for producing upshift and downshift signal events at the respective upshift and downshift points. Counting means are connected with the shift signal channels and are responsive to the upshift and downshift signal events for producing a net count indicative of the speed range to be established in the transmission. The counting means includes a decoder for producing a command signal for controlling the shifting of the transmission. Feedback is provided from the decoder to the upshift and downshift signal circuits to inhibit the production of an upshift or downshift signal event except in the next higher or lower speed range. A manual selector means is provided to allow the operator to select the highest speed range in which the vehicle is operated. The manual selector means inhibits the generation of an upshift signal event for all speed ranges above the selected speed range.

Additionally, the automatic control system provides a torque converter lock-up in a predetermined speed range with momentary dropout during upshifts and downshifts in the higher speed ranges. Additionally, a manual control is provided to hold the transmission in a selected speed range regardless of changes in vehicle speed. Further, the control system provides for manual selection of reverse drive, a low-low forward speed range and transmission neutral. The operator may operate the manual selection means at any vehicle speed but the automatic control system will prevent actuation until the transmission has been shifted into the first speed range. Also, an interlock is provided to prevent engine starting unless the manual selector means is in neutral position.

In the preferred embodiment of the invention, the control system utilizes digital logic which is implemented in integrated circuits of the CMOS type.

A more complete understanding of this invention may be obtained from the detailed description that follows, taken with the accompanying drawings in which:

FIG. 7 is a block diagram of the speed signal generating means;

FIG. 8 shows one channel of the shift signal generating means;

FIG. 10 is a table showing the decoder output and solenoid energization for each transmission range;

FIG. 11 is a table showing the state of the speed range control circuit for each transmission range.

FIG. 14 is a block diagram of the 1-2 and 2-1 shift signal generator and the manual reverse selection channel;

FIG. 15 is a truth table for the reverse selection channel of FIG. 14;

FIG. 18 is a block diagram of the manual low-low selection channel;

FIG. 19 is a truth table for FIG. 18; and

GENERAL DESCRIPTION OF THE PREFERRED EMBODIMENT

Figure 1:
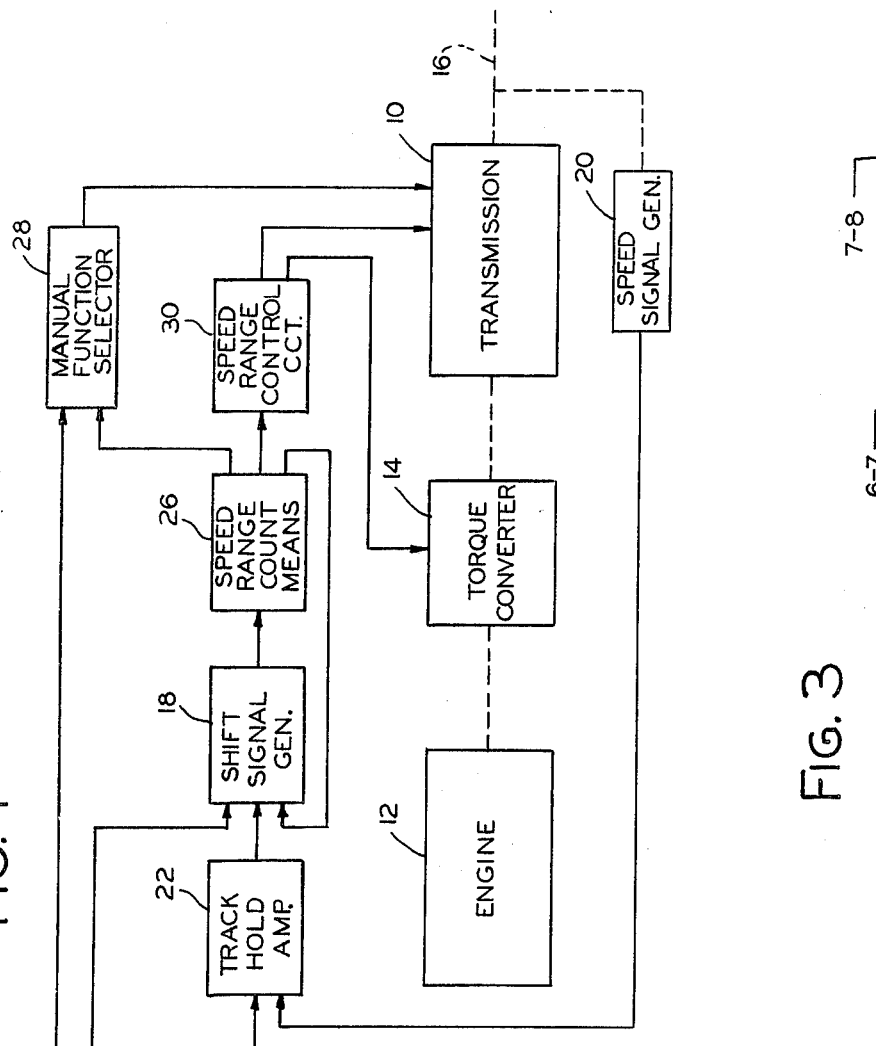
FIG. 1 is a block diagram of the automatic transmission control system.

Referring now to the drawings, there is shown an illustrative embodiment of the invention in an automatic transmission control system especially adapted for off-highway vehicles, for example an earth moving vehicle type such as a scraper. It will be appreciated as the description proceeds that the inventive control system is also applicable to other types of vehicles.

The automatic transmission of this illustrative embodiment is of a conventional type comprising a change-speed transmission and a torque converter coupled between the input shaft of the transmission and the engine. The transmission is provided with plural gear sets to provide a plurality of speed ranges or gears having different ratios between the input and output shafts. The different gear sets are selected by hydraulic actuators under the control of shift valves which are operated by electromagnets or solenoids. In the illustrative embodiment, the transmission has eight automatically selectable forward speed ranges, and three manually selectable functions, namely low-low forward speed range, reverse drive and neutral.

The automatic transmission control system is shown in block diagram in FIG. 1. The transmission 10 is driven by an engine 12 through a torque converter 14 and the output shaft 16 of the transmission is coupled with the traction wheels of the vehicle. The automatic control system comprises a shift signal generating means 18 which is responsive to a vehicle speed signal for generating transmission shift signals, subject to a manually selected speed range inhibit signal. The speed signal is produced by a speed signal generating means 20 which is mechanically coupled with the output shaft 16 of the transmission. The speed signal is applied through an amplifier 22 to the input of the shift signal generator. A speed range selector signal is produced by a manually actuated cab control selector switch 24 and is applied to the shift signal generating means 18 to prevent upshift of the transmission beyond the speed range selected by the operator. The shift signal generating means 18 produces a succession of upshift signal events at predetermined increasing speeds of the vehicle and a succession of downshift signal events at predetermined decreasing speeds of the vehicle. The upshift and downshift signals are applied to the input of a speed range counting means 26. The counting means is incremented one for each upshift signal event and decremented one for each downshift signal event so that the net count represents a speed range command signal, i.e. a speed range into which the transmission is to be shifted. A feedback loop is provided between the output of the counting means and the input of the shift signal generating means to insure that the speed range command signal will be changed by only one speed range at a time. A speed range control circuit 30 is connected to the output of the counting means 28 and controls energization of the solenoids of the transmission 10 for selection of the speed range corresponding to the command signal. The control circuit also produces a lock-up control signal for control of the torque converter lock-up solenoid. A manual function selector. means 28 is provided for reverse drive, low-low speed range and neutral. The selector switch 24 is provided with means for selecting the manual functions and provides the appropriate input signal to the manual function selector means 28. The manually selected functions are operable only when the transmission is in first speed range and for this purpose the counting means 26 produces an inhibit signal which is applied to the manual function selector means 28. The output of the manual function selector means is applied to the appropriate solenoid in the transmission 10. Means are provided to allow the operator to prevent automatic shifting under certain working conditions. For this purpose, amplifier 22 is a track and hold amplifier with an inhibit input for selecting either a tracking mode of operation, i.e. linear amplification, or a holding mode of operation, i.e. holding the output at the existing level. Manual inhibit means 32 provides an inhibit signal to the track and hold amplifier 22.

Figure 2:
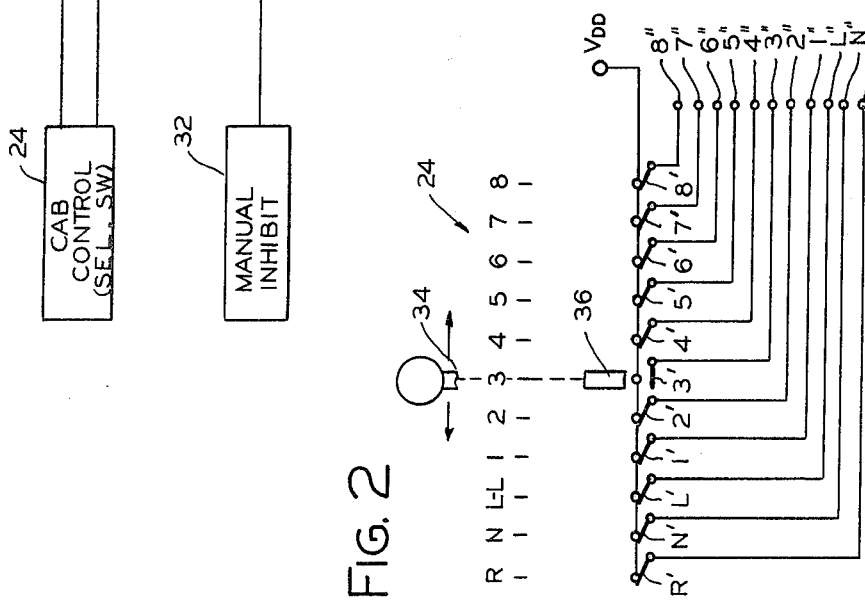
FIG. 2 is a schematic diagram of the cab control selector switch.

A schematic diagram of the cab control selector switch 24 is shown in FIG. 2. The selector switch comprises a shift lever 34 which is manually movable to a plurality of positions and carries a switch actuator 36 into corresponding positions. The shift lever positions, as indicated in FIG. 2, correspond to forward drive ranges 1 through 8 and manually selectable functions reverse, neutral and low-low. The selector switch further comprises plural sets of switch contacts R', N', L', and 1' through 8', with one set of contacts associated with each position of the shift lever. The fixed contacts of each contact set are connected to a logic voltage source $V_{DD}$ and the movable contacts of the contact sets are connected respectively with outputs R'', N'', L'' and 1'' through 8''. The contact sets are normally closed and the switch actuator 36 is adapted to open one contact set at a time, namely the contact set at the position corresponding to the position of the shift lever.

Accordingly, the output which is associated with the selected speed range or manual function is at logical low and all the other conductors are at logical high.

Figures 4, 5:
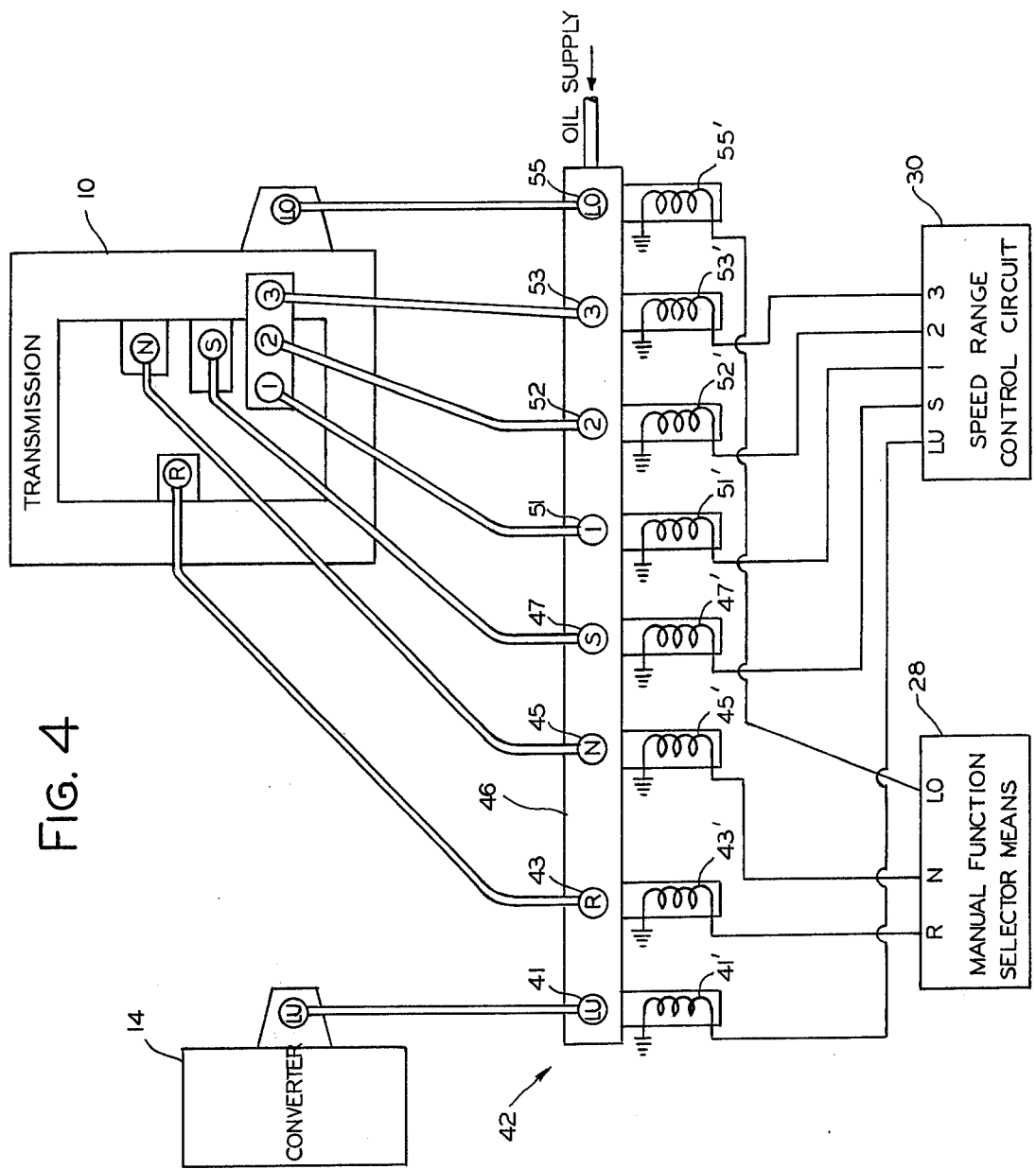
FIG. 4 is a diagram showing the transmission and torque converter with shift value solenoids.
FIG. 5 is a table showing solenoid energization for different speed ranges.

The transmission 10 and torque converter 14, together with the electrohydraulic interface with the control system are depicted in FIG. 4. A typical powershift transmission with solenoid actuated shift valves, such as that shown in FIG. 4, has a number of solenoids less than the number of forward speeds. As shown in FIG. 4, an electrohydraulic interface unit 42 is interposed between the speed range control circuit 30 and the manual function selector means 28 on the one hand and the transmission 10 and torque converter 14 on the other hand. The interface unit 42 is shown in schematic fashion and comprises a valve body 46 provided with a plurality of shift valves 41 (lock-up), 43 (reverse), 45 (neutral), 47 (splitter), 51, 52, 53 and 55 (low-low), and associated solenoids 41', 43', 45', 47', 51', 52', 53' and 55'. A hydraulic port for each shift valve is provided in the valve body 46 and each hydraulic port is connected through a conduit to a hydraulic actuator on the transmission or torque converter for engagement or release of an associated clutch or brake to effect a change in the gear train. It is noted that solenoids 51', 52', 53' and 47' are utilized in various combinations for the selection of eight speed ranges, i.e. first speed range through eighth speed range. It is further noted that the solenoids 55', 41', 43' and 45' are utilized in different combinations with the other solenoids to select low-low, converter lock-up, reverse drive and neutral. The combination of solenoids which are energized to obtain the different speed ranges is set forth in FIG. 5.

Figure 3:
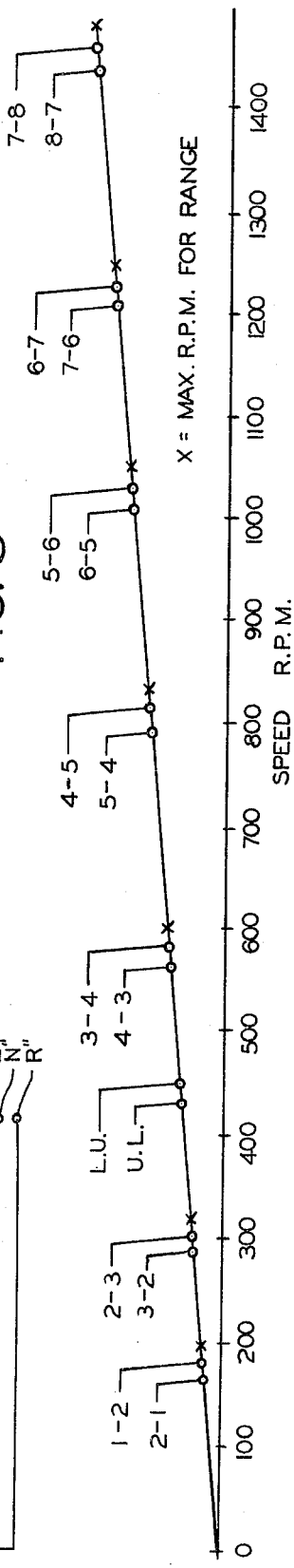
FIG. 3 is a graphical representation of the transmission speed ranges.

The shift pattern of the automatic transmission is depicted in the chart of FIG. 3. This chart shows the upshift points and the downshift points as a function of speed of the transmission output shaft which is proportional to vehicle speed. It is noted that the upshift points are designated as 1-2 for the shift point from the first speed range to the second speed range, 2-3 as the shift point for shifting from the second speed range to the third speed range and so forth. Likewise, the downshift points are designated at 8-7 for the shift point from the eighth speed range to the seventh speed range, 7-6 for the shift point from the seventh speed range to the sixth speed range, and so forth. It is noted that adjacent speed ranges are joined by a transition zone which is bounded by the respective upshift and downshift points, with the upshift point being at a higher speed than the downshift point. For each of the speed ranges the transmission output shaft can reach a speed higher than the upshift point for that range which, of course, is necessary to permit automatic shifting. However, the engine speed is governed so that for each transmission speed range the transmission output shaft speed cannot exceed the value indicated by the x symbol on the graph of FIG. 3. Note that the x symbol for a given speed range is located at a position in the next higher speed range.

Before proceeding with the detailed description of the control system it will be helpful to consider a summary of operation of the system as described above with reference to FIGS. 1, 2 and 3. To start the vehicle, the operator must position the shift lever 34 in the neutral position. After starting, the shift lever may be positioned in any of the speed ranges. With the vehicle at a standstill and the shift lever in any of the speed ranges 1 through 8, the transmission will be shifted to the first range. If the fifth speed range is selected by the shift lever, for example, and the operator depresses the accelerator pedal causing the vehicle speed to increase, the transmission will automatically shift from first to second at the upshift point 1-2. As the speed continues to increase the transmission will automatically shift from second to third, from third to fourth and from fourth to fifth at the respective upshift point. However, the transmission will not upshift out of the fifth speed range because of the speed range inhibit signal supplied by the selector switch 24 to the shift signal generator 18. If the operator releases the accelerator pedal to slow the vehicle, the transmission will automatically downshift at the speeds indicated by the respective downshift points. If the operator desires to prevent either upshift or downshift at any given speed, as for example, while performing a scraping operation, the manual inhibit switch 32 is actuated and the vehicle speed signal applied to the shift signal generator 18 will remain constant even though vehicle speed is varied. To shift the transmission to reverse, neutral, or low-low, the operator may position the shift lever 34 to the corresponding position from any other position of the shift lever; however, the manual function signal from the selector switch to the manual function selector 28 will not be effective unless the transmission is in the first speed range. This is provided by the inhibit signal from the speed range counting means 26. The inhibit signal will be removed only after the vehicle speed is decreased sufficiently to allow the transmission to shift into first speed range. The automatic control system and the manner in which it operates will now be described in greater detail.

DETAILED DESCRIPTION OF THE PREFERRED EMBODIMENT

The control system of this invention will now be described in detail. First, the automatic shift control system for the forward speed ranges will be described. This includes the speed signal generating means of FIG. 7, the shift signal generating means 18, shown in detail in FIG. 6, and the speed range counting means 26 also shown in FIG. 6. The shift signal generating means 18 comprises a separate signal generator or channel for each speed range which will be described with reference to FIG. 8. Further, the feedback loops from the speed range counting means 26 to the shift signal generating means will be described with reference to FIG. 8 and FIG. 6. The speed range control circuit 30 which receives its input from the counting means 26 and controls the energization of the solenoids will be described with reference to FIGS. 9, 10 and 11. The lock-up converter channel will be described with reference to FIGS. 12 and 13. Additionally, the manual select function means 28 including the reverse, neutral and low-low selection channels will be described with reference to FIGS. 14, 16 and 18 respectively.

Speed Signal Generating Means

In order to provide a speed signal voltage which is proportional to the output speed of the transmission, a speed signal generating means is provided as shown in FIG. 7. This comprises a transducer in the form of a variable reluctance magnetic pickup 48 which comprises a toothed wheel 50 and a pickup coil 49 having a pole face adjacent the periphery of the toothed wheel. The toothed wheel is driven synchronously with the output shaft of the transmission and generates an alternating voltage in the pickup coil 52 having a frequency proportional to the speed of the transmission output shaft and having an approximately sinusoidal waveform. The output of the pickup coil 49 is applied to the input of a squaring amplifier 54. The amplifier 54 produces an alternating output voltage having a flat top waveform of constant amplitude. The output of the squaring amplifier is applied to the input of the digital to analog converter 56. The converter 56 comprises a rectifier which converts the alternating voltage to a DC voltage and also includes a passive filter network. The filter network is suitably a low pass filter to remove the ripple and to slow the output response of the converter to transient inputs caused by fast speed changes resulting from wheel slip and the like. The output of the converter 56 is applied to the track input of the track and hold amplifier 22. When the amplifier is operated in the track mode the amplifier output is a linear function of the input and constitutes a speed signal proportional to the speed of the transmission output shaft. When operated in the hold mode the amplifier 22 produces a constant output voltage which is equal to the voltage value which exists at the time the amplifier mode is switched from track to hold. In order to switch the amplifier from track to hold and vice versa, the manual inhibit control 32 is provided. This comprises a source of logic voltage $V_{DD}$ connected through a manually actuated switch 58 to the hold input of the amplifier 22. The purpose of the manual inhibit control 32, as mentioned above, is to enable the operator to prevent upshift or downshift of the transmission regardless of vehicle speed changes; the manner in which this is accomplished will be more fully described below.

The speed signal generated by the speed signal generating means is applied to the input of the shift signal generating means which will be described in detail presently.

Shift Signal Generating Means

Figure 6:
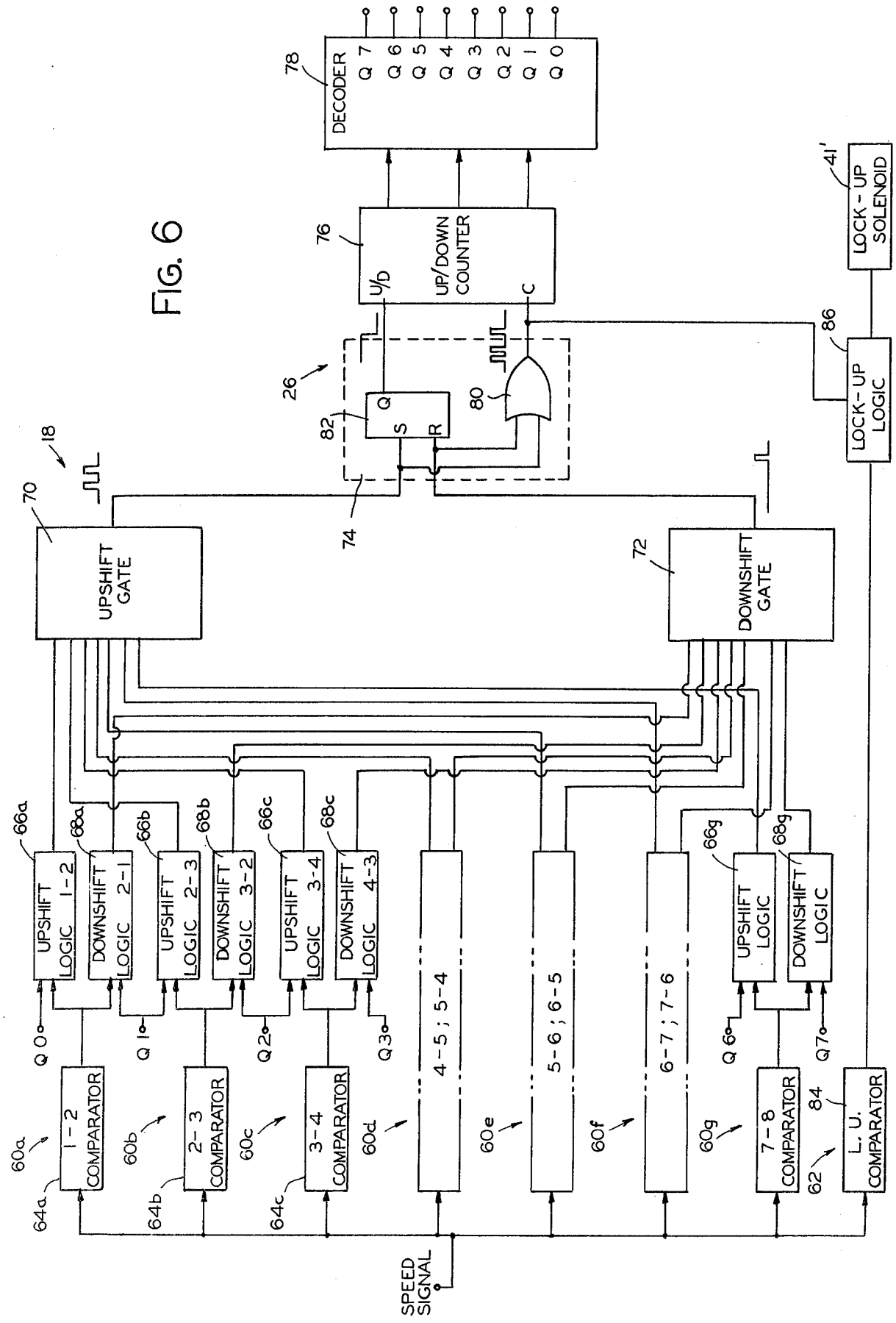
FIG. 6 is a block diagram of the shift signal generating means and the speed range counting means.

For the purpose of producing upshift and downshift signal events in accordance with speed changes of the transmission output shafts, the shift signal generating means 18 is provided, as shown in FIG. 6. The speed signal generating means comprises a plurality of shift signal channels 60a, 60b, 60c, 60d, 60e, 60f and 60g and a lock up channel 62. The shift signal channels 60a through 60g correspond respectively with the first through eighth speed ranges and each channel is adapted to produce an upshift signal and a downshift signal. The lock-up channel 62 is adapted to produce a lock-up signal for the torque converter.

The speed signal channel 60a comprises a level detector or comparator 64a which receives the speed signal from the track and hold amplifier 22. The comparator 64a is adapted to produce a speed logic signal which changes from a first logic state to a second logic state at the upshift speed point for the first speed range and which changes from the second logic state to the first logic state at the downshift speed point for the second speed range. The output of the comparator 64a is applied to one input of an upshift logic circuit 66a and to one input of a downshift logic circuit 68a. The upshift logic circuit 66a produces an upshift signal which is applied to one input of an upshift gate 70 and the downshift logic circuit 68a produces a downshift signal which is applied to one input of a downshift gate 72. Similarly, the shift signal channel 60b comprises a comparator 64b, an upshift logic circuit 66b and a downshift logic circuit 68b. The remaining shift signal channels 64c through 64g are the same and, as shown in FIG. 6, are designated with corresponding reference characters. The upshift signals produced by each of the upshift logic circuits 66a through 66g are applied to respective inputs of the upshift gate 70 which is adapted to produce an upshift signal event in response to an upshift signal event from any one of the channels. Similarly, the downshift signals from each of the downshift logic circuits 68a through 68g are applied to respective inputs of the downshift gate 72. This gate produces an output downshift signal event in response to a downshift signal event from any one of the channels.

The outputs of the upshift gate 70 and downshift gate 72 are applied to the input of the counting means 26 which will now be described.

Speed Range Counting Means

The counting means 26 is provided to produce a command signal which represents the speed range of the transmission which is called for by the existing speed of the vehicle; in general this is done by accumulating the net count of upshift and downshift signal events starting with the transmission in first range. The counting means 26 comprises a signal converter 74, an up/down counter 76, and a decoder 78.

The signal converter 74 is adapted to accept the upshift and downshift signals from the outputs of upshift and downshift gates 70 and 72, respectively, and convert the signals into a form suitable for inputs to the up/down counter 76. It is desired to cause the counter 76 to be incremented by one for each upshift signal event and to be decremented by one for each downshift signal event. For this purpose the converter 74 is adapted to produce a clock output which produces a single output pulse for each input pulse from the upshift and downshift gates 70 and 72. It is also adapted to produce an up/down output which has one logic state in response to an upshift signal event from gate 70 and it has the other logic state in response to a downshift signal event from the gate 72. The converter 74 suitably comprises a 2-input OR gate 80 having one input connected with the output of upshift gate 70 and the other input connected with the output of downshift gate 72. The output of the OR gate 80 is a clock signal with one pulse for each upshift and downshift signal event. An RS flip-flop 82 is suitably used to develop the up/down output signal. The set input of the flip-flop 82 is connected with the upshift gate 70 and the reset input of the flip-flop is connected with the downshift gate 72. Accordingly, the Q output produces and up/down signal which is high for upshift signal events and low for downshift signal events.

The up/down counter 75 has its up/down input connected with the corresponding output of the converter 74 and has its clock input connected with the clock output of the converter 74. This counter counts the pulses appearing at the clock input. Specifically, it counts up for each clock pulse when the up/down input is high and it counts down for each pulse at the clock input when the up/down input is low. Since the up/down counter starts with a count of one (corresponding to first speed range), the counter accumulates a count equal to one plus the difference between the number of upshift and downshift signal events. The counter 76 produces an output signal in binary form, suitably a 3-bit parallel output. This output from the up/down counter 76 represents the information required for controlling the shifting of the transmission into the desired speed range. However, it is preferred to convert the binary count into an output in a more suitable number system for use as a command signal. For this purpose, the output of the up/down counter is applied to the input of the decoder 78 which is a binary-to-octal decoder. The octal output of the decoder is especially suitable since it provides one-of-eight output information with one output corresponding to each of the eight forward speed ranges of the transmission. The decoder 78 has an 8-bit parallel output, the outputs Q0 through Q7 corresponding to transmission speed ranges 1 through 8, respectively. In the octal output of the decoder only one output is high while all others are low; in particular, when the Q0 output is high the command signal represented by the decoder output calls for first range. When the counter is incremented by one the output of Q1 will go high and all other outputs will be low, thus calling for second speed range. The output of the decoder is incremented or decremented by the succession of upshift or downshift signal events, respectively, from the shift signal generator.

The command signal output from the speed range counting means 26, as represented by the output of decoder 78 is applied to the input of the speed range control circuit 30 to bring about the appropriate shifting of the transmission. The speed range control circuit 30 will be described in detail subsequently.

In accordance with the invention, means are provided to ensure that the command signals will be incremented or decremented by only one count at a time. To accomplish this, a feedback loop is connected from the output of the decoder to the inputs of the shift signal generator channels. As shown in FIG. 6, the output Q0 is applied to an enable input of upshift logic circuit 66a. Similarly, a feedback conductor from Q1 is connected to enable inputs of the downshift logic circuit 68a and the upshift logic circuit 66b. The output Q2 is connected with the enable inputs of downshift logic circuit 68b and the upshift logic circuit 66c. The remainder of the outputs of the decoder 78 are connected in similar fashion to the respective enable inputs of the upshift and downshift logic circuits as indicated. With the command signal of the decoder 78 calling for any given speed range of the transmission, the feedback arrangement will prevent all shift signal channels, except the immediately higher and immediately lower channel, from generating a shift signal event. The feedback circuit will be described in greater detail subsequently with reference to FIG. 8.

Referring further to FIG. 6, the lock-up channel 62 will be described. This channel comprises a lock-up comparator 84 having an input which receives the speed signal from the track and hold amplifier 22. The comparator 84 responds to the speed signal for producing a speed logic signal at its output which changes from a first logic state to a second logic state at a predetermined lock-up point (L.U.) in the third speed range at a speed indicated in the chart of FIG. 3. The output changes from a second logic state to the first logic state at the unlock point (U.L.) in the third speed range at a speed indicated in FIG. 3. The output of the lock-up comparator 84 is applied to the input of a lock-up logic circuit 86. The logic circuit 86 also receives the clock signal from the signal converter 74 to cause unlocking of the converter during each shift from one speed range to another. The logic circuit 86 controls the energization of the lock-up solenoid 41'. A more detailed description of the lock-up channel will be given subsequently with reference to FIGS. 12 and 13.

Shift Signal Channels

The shift signal channels 60b through 60g which correspond with transmission speed ranges 2 through 8 are all the same except that they produce shift signal events at different values of the speed signal (Shift signal channel 60a which corresponds to the first speed range is the same as the other shift signal channels except that it has an inhibit input for preventing upshift from first range when the transmission is in reverse. The shift signal channel 60a will be described along with the reverse selection channel with reference to FIG. 14.)

The shift signal channel 60b which corresponds to the second speed range of the transmission will be described in detail with reference to FIG. 8; this description will be applicable also to channels 60a and 60c through 60g, as noted above. The shift signal channel 60b is adapted to respond to the speed signal from the track and hold amplifier 22 and produce an upshift signal event at shift point 2-3 (see FIG. 3) to cause upshift from second range to third range; it is also adapted to produce a downshift signal event at shift point 3-2 (see FIG. 3) to cause downshift of the transmission from third range to second range.

In general, the shift signal channel 60b comprises a comparator 64b for converting the analog speed signal to a digital logic signal. The output of the comparator is applied through an inverter 90 to one input of an upshift NAND gate 92. The selector switch 24 has its output 2" (second speed range) connected with another input of NAND gate 92. The output 2" will be at logical high unless the selector switch is positioned to select the second speed range in which case output 2" will be low to inhibit upshift above second range. A feedback inhibit signal from output Q1 of the decoder 78 is applied to another input of the NAND gate 92. The output of the NAND gate is applied to the input of a one-shot multivibrator 94 which responds only to a negative-going input pulse and produces a logical low output pulse of short duration, for example about one-half millisecond. The output of the one-shot 94 is applied to one input of the upshift gate 70 which is a 7-input NAND gate.

The output of the comparator 64b is also applied to one input of a downshift NAND gate 96. A feedback inhibit signal from the Q2 output of the decoder 78 is applied to another input of the NAND gate. The output of the NAND gate 96 is applied to the input of a one-shot multivibrator 98. This one-shot also responds only to negative-going input pulse and produces a logical low output pulse of the same duration as that of one-shot 94. The output of the one-shot 98 is applied to one input of the downshift gate 72, a 7-input NAND gate.

Referring now to the comparator 64b, it functions to control both the upshift point and the downshift point for the transmission speed range. For this purpose the comparator is provided with switching hysteresis and it functions as a Schmitt trigger with presettable input trigger points corresponding to the upshift and downshift points. The speed signal $V_s$ from the track and hold amplifier 22 is applied to the inverting input of the comparator. A reference voltage $V_r$ is applied to the non-inverting input. A pair of voltage dividing resistors 98 and 100 are connected in series across a logic level voltage source $V_{DD}$. The non-inverting input is connected to the junction of resistors 98 and 100. A pull-up resistor 104 is connected between the voltage source and the output of the comparator and a feedback resistor 106 is connected between the output and the non-inverting input. A capacitor 108 is connected between the output of the comparator and ground. The positive feedback provided by the feedback resistor 106 not only provides stability but also enables presetting of the trigger points. The capacitor 108 enhances the switching action from one state to the other. The preset trigger points $V_1$ and $V_2$, depicted on the input-output diagram adjacent the comparator, correspond with the upshift points 2-3 and downshift points 3-2 (see FIG. 3), respectively. When the speed voltage $V_s$ is less than the reference voltage $V_r$, the output of the comparator is high; when the input voltage increases the trigger point or trip voltage $V_1$ the output goes low. The output remains low so long as the speed voltage is greater than the lower trigger point or trip voltage $V_2$; when the speed voltage decreases to $V_2$ the output goes high. As is well known, the upper and lower trip voltages are established at desired values by correlating the values of the voltage divider resistors and the feedback resistor.

The operation of the shift signal channel 60b is as follows. Assume that the transmission is in the second speed range and that the selector switch 24 is positioned for the fifth speed range. When the speed signal is less than the upshift point 2-3, the output of the comparator will be high. Accordingly, the output of the inverter 90 will be low and this will cause the output of the NAND gate 92 to be high. At this time the input to the NAND gate 92 from the selector switch 24 is high because output 2" of the selector switch is high (since the selector switch is positioned in fifth range). The feedback input to the NAND gate 92 from output Q1 (second speed range) is also high. With a high output from the NAND gate 92 the one-shot 94 remains inactive. The high output of the comparator is applied directly to one input of the NAND gate 96. The other input to the NAND gate 96 is the feedback from output Q2 (third range) of the decoder and accordingly the output of the NAND gate 96 is high and the one-shot 98 is inactive. When the speed signal increases to the value of the 2-3 shift point the output of the comparator 64b goes low. This has no effect on the output of the downshift NAND gate 96; however, it causes the output of the upshift NAND gate 92 to go low and the one-shot 94 is triggered. Triggering of the one-shot 94 produces a logical low output pulse which constitutes an upshift signal event. This logical low pulse is applied to one input of the upshift gate 70. At this time all the other inputs of the gate 70 are at logical high. Accordingly, the upshift gate 70 produces a high output pulse which represents the upshift signal event. This upshift signal event is applied to the signal converter 74 and the up/down output goes high and the clock output also goes high. Accordingly, the up/down counter 76 is incremented by one. This causes the decoder output signal to be incremented so that output Q2 (third range) goes high while output Q1 goes low and the other outputs remain low. Thus the command signal from the decoder 78 is incremented to the third speed range and will be utilized to cause the transmission to shift from second to third range. This change in the command signal also changes the feedback so that Q1 output goes low and the upshift NAND gate 92 goes high. The transition from low to high at the input of the one-shot 94 does not trigger it and it remains inactive. The low feedback signal to the upshift gate 92 holds the output of the gate high and inhibits generation of another upshift signal event. At the same time the feedback from Q2 to the downshift gate 96 goes high and the output of this gate will remain high until the comparator output goes high. Thus the shift signal channel is conditioned for generating a downshift signal event. When the speed signal decreases below the downshift point 3-2, the comparator output goes high causing the output of the gate 96 to go low. This triggers the one-shot 98 which produces a logical low output pulse. This causes the NAND gate 72 to produce a downshift signal event which decrements the counter 76 by one. Accordingly, the decoder output is decremented so that Q1 goes high, Q2 goes low and the remaining outputs remain low. In this condition, the decoder output represents a command signal for shifting into second speed range.

The Speed Range Control Circuit

Figure 9:
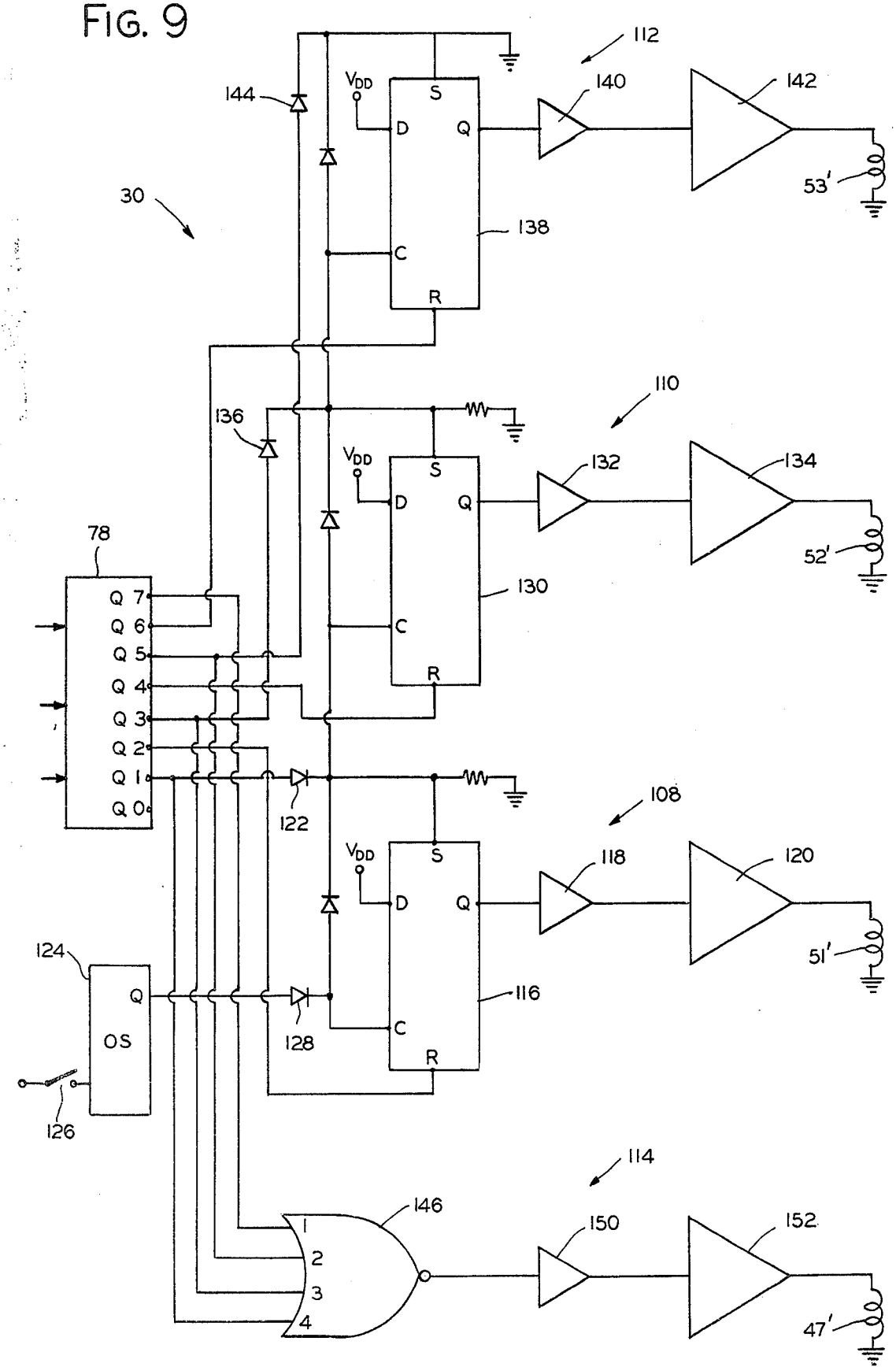
FIG. 9 shows the speed range control circuit.

The speed range control circuit 30, as shown in detail in FIG. 9, is adapted to selectively energize solenoids 51', 52' and 53' and the splitter solenoid 47' in accordance with the command signal. i.e. the output signal of the decoder 78 for the purpose of selectively placing the transmission in speed ranges 1 through 8. The table of FIG. 10 shows the state of the decoder output, i.e. the command signal, for each of the transmission ranges 1 through 8. This table also shows which of the four solenoids are energized for each of the transmission speed ranges. It is noted that for the first range, only solenoids 51', 52' and 53' are energized, for the third range only solenoids 52' and 53', for the fifth range only solenoid 53', and for the seventh range no solenoids are energized. It is further noted that for speed ranges 2, 4, 6 and 8 the splitter solenoid is energized along with those solenoids which were energized for the immediately lower range.

This control of the solenoids in accordance with the command signal is provided by the logic circuit of FIG. 9. This circuit comprises a solenoid control channel 108 for solenoid 51', solenoid control channel 110 for solenoid 52', solenoid control channel 112 for solenoid 53', and solenoid channel 114 for the splitter solenoid 47'. The solenoid channel 108 comprises a D-type flip-flop 116, a driver amplifier 118, a power amplifier 120 and the solenoid 51'. The flip-flop 116 is adapted for control by its set and reset inputs. For this purpose, the data input is connected with a logic voltage source and the set input is connected through a diode 122 with the Q1 output of the decoder 78 and the reset input of the flip-flop 116 is connected with the Q2 output of the decoder. For initializing the condition of the flip-flop 116 at start-up, a one-shot multivibrator 124 has its input connected with a power on-switch 126 and its output connected through a diode 128 to the set input of the flip-flop 116. In a similar fashion, the solenoid control channel 110 comprises a D-flip-flop 130, a driver amplifier 132, a power amplifier 134 and the solenoid 52'. The data input and clock input are connected in the same manner as in flip-flop 116. The set input of flip-flop 130 is connected through a diode 136 to the Q3 output of the decoder 78 and the reset input is connected to the Q4 output. Similarly, the solenoid control channel 112 comprises a flip-flop 138, a driver amplifier 140 and a power amplifier 142. The data and clock inputs of this flip-flop are connected as in flip-flop 116. The set input of flip-flop 138 is connected through a diode 144 to the Q5 output of the decoder 78 and a reset input is connected to the Q6 output. The splitter solenoid control channel 114 comprises a 4-input OR gate 146, a driver amplifier 150, a power amplifier 152 and the splitter solenoid 47'.

The operation of the speed range control circuit will be described with reference to FIG. 9 and the chart of FIG. 11. The control circuit is placed in the proper initialized condition when the system power is turned on. With the power on, the switch 126 is closed and the one-shot 124 produces a high output pulse of about one half second which is applied to the set inputs of the flip-flops 116, 130 and 138. At start-up, the decoder output Q0 will be at logical high, as required by the neutral interlock system, which will be described subsequently with reference to FIG. 16. Therefore, at start-up the other outputs of the decoder 78 are at logical low and the set and reset inputs of the flip-flops 116, 130 and 138 are low. Accordingly, the Q outputs of all three flip-flops are set initially high by the initializing pulse from the one-shot 124. This state of the flip-flops for first speed range is shown in the table of FIG. 11. At this time, the inputs to the OR gate 146 are low and the output is low. Accordingly, solenoids 51', 52' and 53' are energized and the splitter solenoid is deenergized as indicated in the table of FIG. 10 for the first speed range.

When the command signal produced by the decoder 78 calls for the second speed range, the Q1 output goes high and the remaining outputs are low. This causes the set input of flip-flop 116 to go high while the reset input remains low and the inputs to the other flip-flops remain unchanged. The Q output of flip-flop 116 is unchanged since it was already high and the Q outputs of the flip-flops 130 and 138 remain high. Accordingly, solenoids 51', 52' and 53' remain energized. In the splitter solenoid control channel the OR gate 146 receives a high input from the Q1 output of the decoder and accordingly the output of the OR gate goes high. In this condition the splitter solenoid 47' is energized as required for second speed range, as indicated in the table of FIG. 10.

When the command signal produced by the decoder 78 calls for a third speed range, the Q2 output goes high and the remaining outputs go low. It will be seen by examination of FIG. 9 and as shown in the table of FIG. 10, that the output of flip-flop 116 goes low and the outputs of flip-flops 130 and 138 go high. Also, the OR gate 146 goes low. Accordingly, only solenoids 52' and 53' are energized, as required, for third speed range. The table of FIG. 11 shows the changes of state of the decoder and the flip-flops for a sequence of command signals calling for shifting up to fifth range and back down to first range. The operation of the speed range control circuit of FIG. 9 for the selection of all speed ranges will now be apparent.

Converter Lock-up Channel

The converter lock-up channel was described generally in connection with the shift signal generating means 18 of FIG. 6. The converter lock-up channel will now be described in greater detail with reference to FIGS. 12 and 13. The lock-up comparator 62 is of the same circuitry as comparator 64b (described with reference to FIG. 8) except for the values of the trigger points. The trigger point V1 has a value corresponding to the lock-up speed (L.U.) shown in FIG. 3 and the trigger point V2 has a value corresponding to the unlock speed (U.L.) shown in FIG. 3. Both the lock-up and unlock speeds occur in third range. The output of the lock-up comparator goes from high to low at the lock-up speed and it goes from low to high at the unlock speed. The output is applied to one input of a NOR gate 154. The output of a one-shot multivibrator 160 is applied to the other input of the NOR gate 154. The output of the NOR gate is applied to a driver amplifier 156 which is connected to a power amplifier 158 for energizing the lock-up solenoid 41'. When the speed signal is below the lock-up point, the high output of the comparator 62 will cause the output of NOR gate 154 to be low regardless of the state of one-shot 160. (As will be described below, the one-shot goes high only during a shift.) When the speed signal increases to the lock-up point the output of the lock-up comparator goes low causing the output of the NOR gate 154 to go high and the lock-up solenoid is energized.

Figure 12:
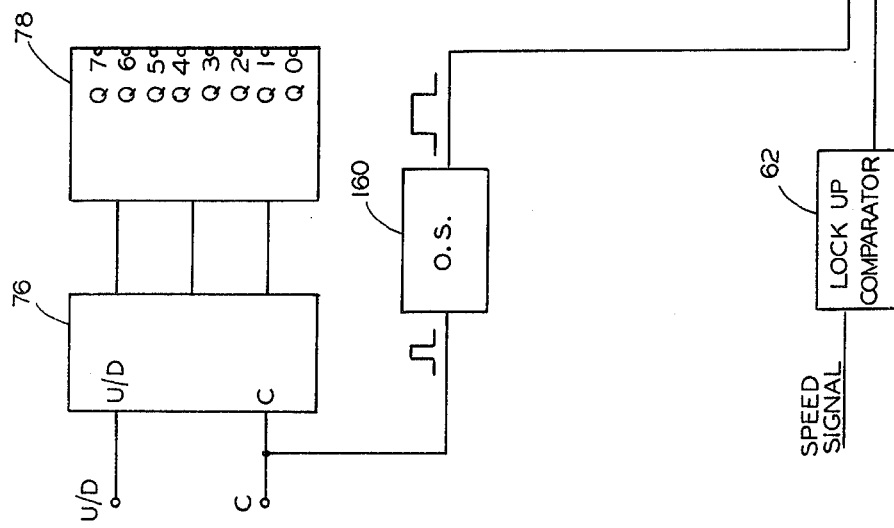
FIG. 12 is a diagram of the torque converter lock-up channel.

As mentioned above, means are provided to provide for momentary unlock of the torque converter during each upshift and downshift above the third speed range. For this purpose, as shown in FIG. 12, the one-shot multivibrator 160 is connected between the clock output of the signal converter 74 and one input of the NOR gate 154. When the one-shot 160 receives a clock pulse on its input it produces a high output pulse on its output, the pulse having a duration of about 250 milliseconds. This causes the output of the NOR gate 154 to go low and the lock-up solenoid is deenergized for the duration of the one-shot output pulse. This unlock of the torque converter during shifting permits a smoother transition from one speed range to another. When the vehicle is accelerated from first speed up through second speed range and shifts to the third range in converter drive and continues accelerating, the lock-up point is reached and the converter is locked up and the slip is eliminated. As a result the engine speed is reduced and the unit continues to accelerate in third speed range with the converter locked up until the governed or maximum speed is again approached and the upshift point 3-4 is reached. At this time the occurrence of the upshift signal event causes the one-shot 160 to produce a momentary dropout signal and the converter is unlocked during the shift from third range to fourth range. This pattern is followed in all further upshifts and a similar pattern is followed in downshifts.

Figure 13:
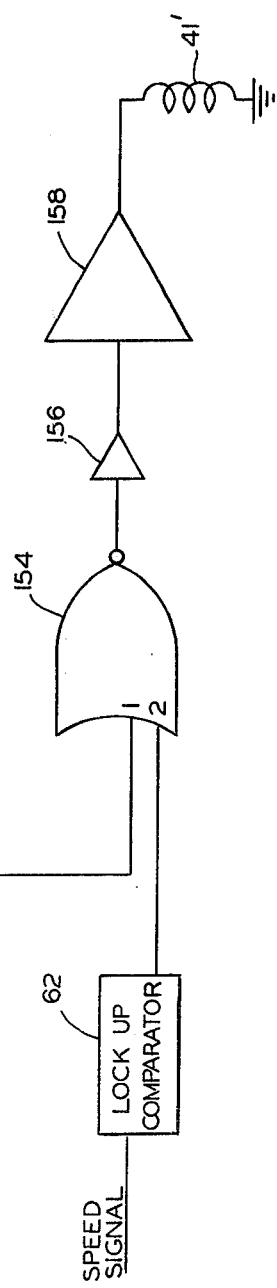
FIG. 13 is a table showing the states of the lock-up logic gates for different speed ranges.

FIG. 13 shows the logic state for the lock-up NOR gate 154 for the transmission ranges and transitions between ranges from first range up through fourth range and back down through third range with the converter drive. Note that the high input pulse from the one-shot 160 during the 1-2 transition and during the 2-3 transition has no effect because the output of the NOR gate is low due to the comparator output and the converter is unlocked. However, after the lock-up point is passed in third range, a high input pulse to the NOR gate 154 causes a low output pulse from the NOR gate and the converter is momentarily unlocked during the transition 3-4 and the transition 4-3.

Manual Functions

As previously alluded to in connection with FIGS. 1 and 4, the transmission includes the manually selected functions of reverse drive, low-low speed range and neutral. The means for effecting these manually selected functions will now be described in detail.

A manual reverse selection channel 162, together with the first speed range shift signal generator 60a is shown in FIG. 14. In the illustrative embodiment, the automatic control system is utilized with an earth moving vehicle such as a scraper which is normally operated in the forward direction. In order to move the vehicle in the reverse direction a single speed range in reverse is provided. This reverse speed range uses the same transmission gear ratio as the first speed range in the forward direction. The operator may select the reverse drive by placing the selector switch 24 in the reverse position. However, in order to provide safety for the operator and to protect the equipment from damage, means are provided to prevent shifting of the transmission into reverse unless the transmission is in first speed range and also to prevent any upshift from the first speed range when the transmission is operated in reverse drive.

The reverse selection channel 162 comprises a 2-input NAND gate 164. The reverse output R" of the selector switch 24 is connected through an inverting buffer 166 to the number 2 input of the NAND gate 164. When the selector switch is in the reverse position, the reverse output R" is low and the number 2 input to the NAND gate 164 is high. The number 1 input of the NAND gate is used as an inhibit input and for this purpose it is connected with the Q0 output of the decoder 78. The Q0 output of the decoder is high only when the command signal calls for the transmission to be in first speed range. When the selector switch is in reverse and the decoder output Q0 is high (first range), the output of the NAND gate is low. The low output of the NAND gate is applied through an invert buffer 168 to a power amplifier 170 and the reverse solenoid is energized and the transmission is shifted to reverse.

In order to prevent upshift of the transmission from first speed range when operating in reverse drive, means are provided to inhibit the generation of an upshift signal event in the shift signal channel 60a. This shift signal channel comprises a comparator 64a which is the same as the comparator 64b of FIG. 8, described above, except that the trigger points are set to provide the upshift point 1-2 and the downshift point 2-1 as shown in FIG. 3. The shift signal channel 60a additionally comprises a downshift circuit including a NAND gate 172 and a one-shot multivibrator 174 which are the same as the NAND gate 96 and one-shot multivibrator 98 of the shift signal channel 60b (described above) except that the Q1 output of the decoder 78 is applied to the number 2 input of the NAND gate 172. The shift signal channel 60a comprises an upshift circuit including an inverter 176, a NAND gate 178 and a one-shot multivibrator 180 which, with the exceptions noted hereinafter, are the same as inverter 90, a NAND gate 92 and one-shot multivibrator 94 of the shift signal channel 60b. The output of one-shot 180 is connected with the input of the upshift NAND gate 70 (FIG. 8) and the output of one-shot 174 is connected with one input of the downshift NAND gate 72. The difference in the upshift circuit is that the NAND gate 178 is provided with a reverse upshift inhibit input and is a 4-input NAND gate. The reverse output R" from the selector switch 24 is applied to the number 2 input of the NAND gate 178 and serves as the reverse upshift inhibit signal. The other three inputs to the NAND gate 178 correspond to the three inputs to NAND gate 92 of shift signal 60b and are as follows: The output of comparator 64a is applied through inverter 176 to input number 3, the output 1" of the selector switch 24 is applied to input number 4 and decoder output Q0 is applied to input number 1. When the selector switch 24 is in the reverse position the output R" will be low. Accordingly, the output of the NAND gate 178 will be maintained high regardless of the state of the other input signals. This will prevent upshift from the first speed range so long as the selector switch is in the reverse position.

FIG. 15 shows the state of the logic stages in the reverse selection channel 162 with the selector switch 24 in reverse position and with the selector switch out of reverse position.

Figures 16, 17:
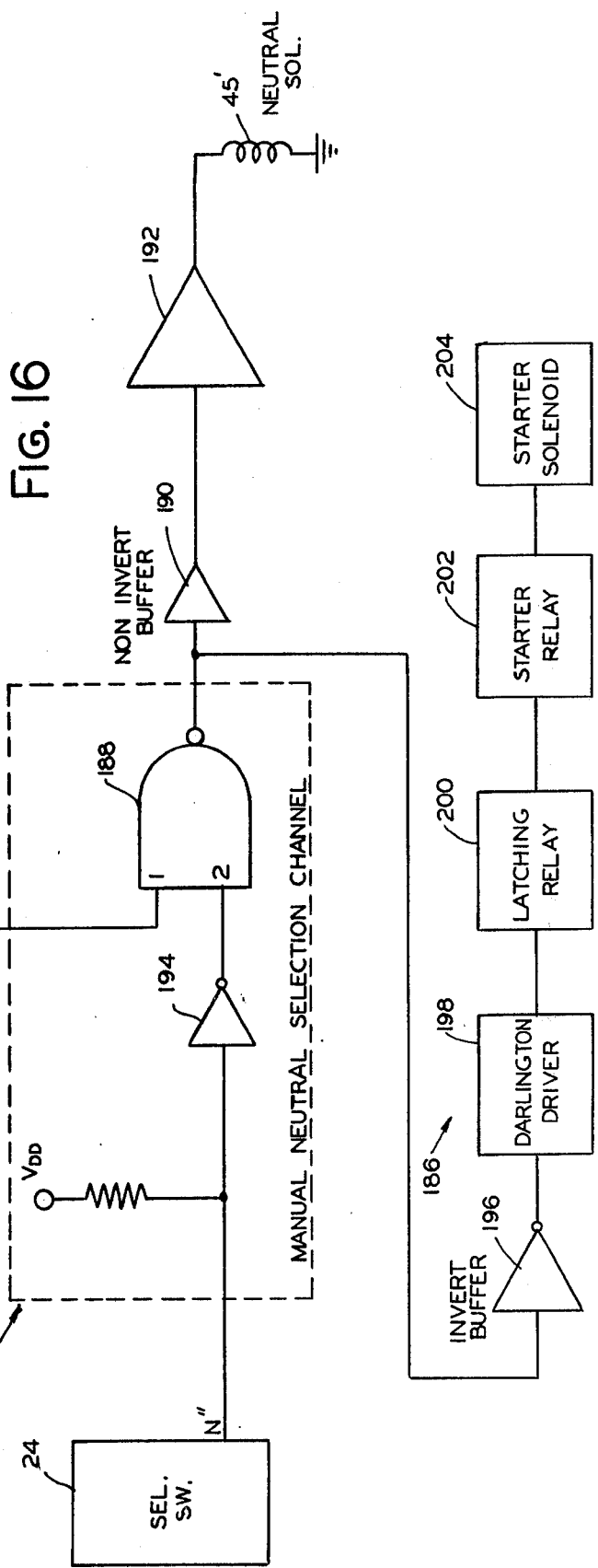
FIG. 16 is a block diagram of the manual neutral selection channel.
FIG. 17 is a truth table for the manual neutral selection channel.

A manual neutral selection channel 184 and a starting interlock circuit 186 are shown in FIG. 16. The neutral selection channel is similar to the reverse selection channel in that the transmission cannot be shifted into neutral unless the command signal from the decoder represents first speed range for the transmission. However, unlike the reverse selection channel, the neutral selection channel deenergizes the neutral solenoid 45" to place the transmission in neutral. This is a safety feature in that loss of electrical power results in shift of the transmission to neutral.

The neutral selection channel 184 comprises a 2-input NAND gate 188 having its inputs connected respectively with the selector switch 24 and the decoder 78. The output of the NAND gate 188 is connected through a buffer amplifier 190 to a power amplifier 192 which is connected with the neutral solenoid 45". The neutral output N" of the selector switch 24 is connected through an inverting buffer 194 to the number 2 input of the NAND gate 188. The number 1 input of the NAND gate is used as an inhibit input and for this purpose it is connected with the Q0 (first range) output of the decoder 78. When the selector switch is in the neutral position, the neutral output N" is low, the output of the inverting buffer 194 is high and the number 2 input to the NAND gate is high. The Q0 output of the decoder is high only when the command signal calls for the transmission to be in first speed range. Accordingly, with the selector switch in neutral and the transmission in first range, the output of the NAND gate 188 is low. This causes the output of the buffer amplifier 190 to be low and the neutral solenoid is deenergized. This places the transmission in neutral. It will be noted that whenever the Q0 output of the decoder is low, regardless of the selector switch position, the output of the NAND gate 188 is high and the amplifiers 190 and 192 energize the neutral solenoid 45" which keeps the transmission out of neutral. FIG. 17 shows the state of the logic gates of the neutral selection channel for the selector switch in neutral position and for the selector switch out of the neutral position.

The starting interlock circuit 186 comprises an inverting buffer 196 having its input connected with the output of the NAND gate 188. The output of the buffer 196 is applied to the input of a Darlington driver amplifier 198 which controls energization of a latching relay 200. The output of the latching relay enables the energization of a starter relay 202 which, when energized causes energization of the starter solenoid 204. With the output of the NAND gate 188 in a low state the transmission is shifted to neutral as described above and the output of the inverting buffer 196 is high, causing the driver amplifier 198 to pull in the latching relay 200 and enable the starter relay 202. In this condition the starter solenoid 204 may be energized by the engine starting switch. The latching relay 200 is employed to ensure that the reduction of battery voltage due to the cranking motor load will not cause dropout of the starter relay even though some of the logic devices may be turned off by the reduced voltage. It is noted that when the selector switch is not in neutral position or when the transmission is not in first speed range, the starting interlock circuit 186 will prevent energization of the starter relay and solenoid.

A low-low selection channel 206 is shown in FIG. 18. The low-low transmission ratio is a deep ratio to provide high torque and low speed for certain operating modes of the vehicle. The low-low range is of such transmission ratio that the output speed of the transmission cannot reach a value as high as the 1-2 upshift point. For this reason, there is no need for providing a positive upshift inhibit control, as in the case of the reverse selection channel.

The low-low selection channel comprises a 2-input NAND gate 208 having its inputs connected with the selector switch 24 and the decoder 78. The output of the NAND gate 208 is applied through an inverting buffer 210 to a power amplifier 212 which controls the energization of the low-low solenoid 55'. The low-low output L" of the selector switch 24 is connected through an inverting buffer 214 to the number 2 input of the NAND gate 208. The number 1 input of the NAND gate 208 is used as an inhibit input and for this purpose it is connected with the Q0 output of the decoder 78. The Q0 output of the decoder is high only when the command signal calls for the transmission to be in first range. When the selector switch is in the low-low position and the transmission is in first range, the output of the NAND gate 208 is low. This causes the output of the buffer 210 to be high and the low-low solenoid 55 is energized causing the transmission to be shifted into the low-low range. The table of FIG. 19 shows the logic state of the various gates of the low-low selection channel with the selector switch in low-low and with the selector switch out of low-low position.

SUMMARY OF OPERATION OF THE CONTROL SYSTEM

The operation of the control system will now be described with reference to the timing diagram of FIG. 20. This diagram shows the change of logic states for a typical cycle of upshift and downshift of the transmission. This cycle of transmission shifting involves primarily the shift signal channel 60b and the speed range counting means 26 as shown in FIG. 8.

Figure 20:
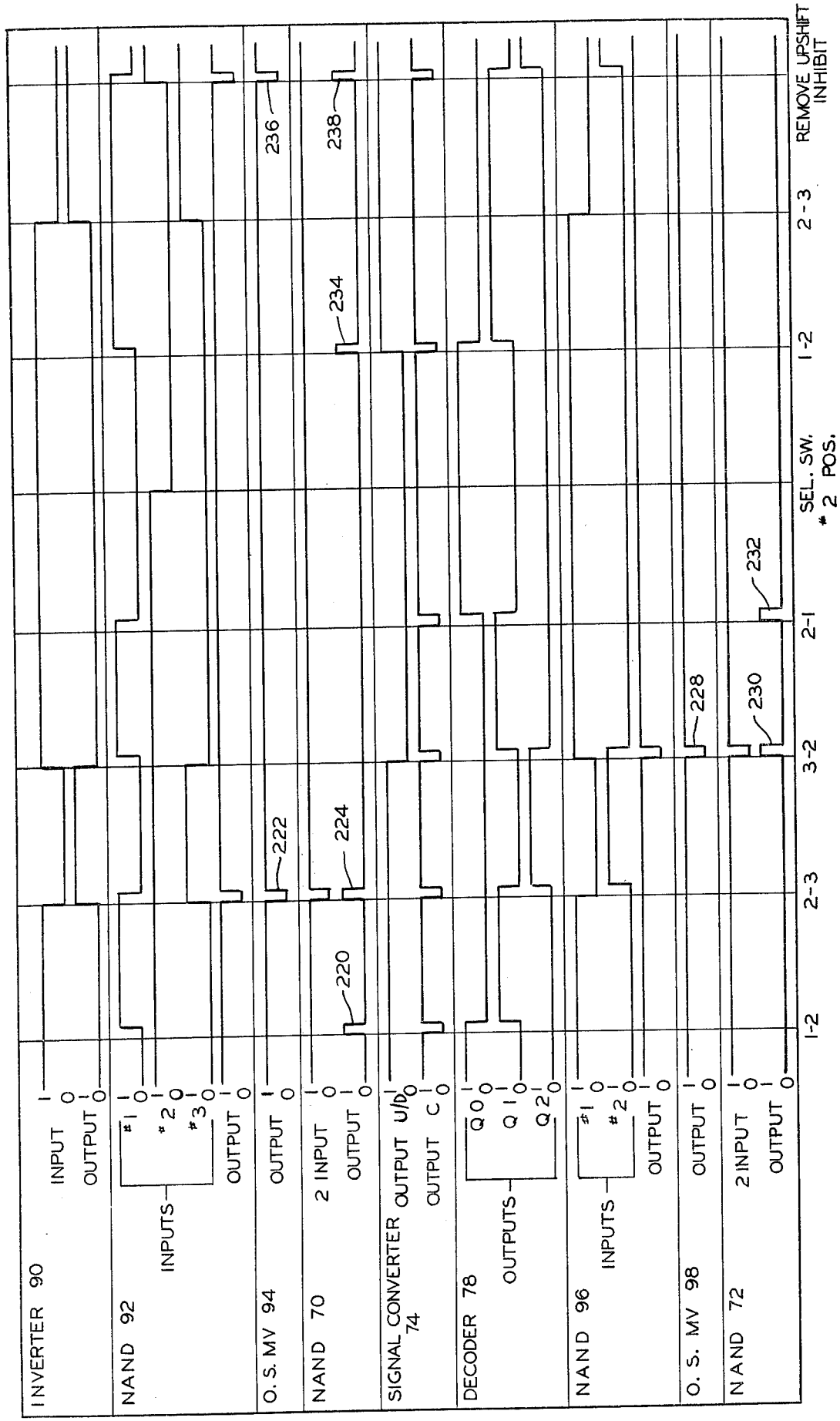
FIG. 20 is a timing diagram for aid in explaining operation of the control system.

In the timing diagram of FIG. 20, the shift points are shown along the abscissa with arbitrary spacing, the spacing between shift points representing a time interval in which the vehicle speed changes from one shift point to the other. The various logic stages of the shift signal channel 60b and speed range counting means 26 are identified at the left-hand side of the diagram opposite the corresponding signal waveform.

At startup of the system the logic circuits assume logic states corresponding to the first speed range as shown by the signals below the 1-2 shift point. When the vehicle speed increases to the 1-2 shift point the comparator 64a in shift signal channel 60a (see FIG. 6) will cause the upshift gate 70 to produce an upshift signal event represented by the pulse 220 in FIG. 20. This signal event is propagated through the signal converter 74 and the up/down counter 76 through the decoder 78 and, as shown in FIG. 20 causes output Q0 to go low and output Q1 to go high. The output Q1 is fed back to the number 1 input of NAND gate 92 (see FIG. 8) and this conditions the NAND gate for initiating an upshift pulse when the shift point 2-3 is reached.

At the shift point 2-3, as shown in FIG. 20, the input to the inverter 90 goes low and accordingly the number 3 input of NAND gate 92 goes high. As a result the output of the NAND gate 92 goes low and the one-shot 94 produces an output pulse 222 which represents an upshift signal event. This output pulse from the one-shot is applied to the number 2 input of the NAND gate 70 and it produces an output pulse 224 representing the upshift signal event. The output pulse of the NAND gate 70 is applied to the signal converter 74 and the up/down output thereof remains high while the clock output produces a pulse 226. This output of the signal converter is applied to the up/down counter which is incremented by one and the output thereof is applied to the decoder 78. This causes the Q1 output of the decoder to go low and the Q2 output to go high, as shown in FIG. 20. It is noted that when the input to the inverter 90 goes low at the 2-3 shift point the number 1 input of the NAND gate 96 goes low and accordingly the output of the NAND gate remains high. Thus when the Q2 output of the decoder goes high immediately following the 2-3 shift point and is applied as the feedback to the number 2 input of NAND gate 96, the output of the NAND gate still remains high. The one-shot 98 and the NAND gate 72 remain inactive. The upshift signal event as just discussed places the transmission in third speed range.

When the vehicle speed is decreased while operating in third speed range to the 3-2 shift point, the input to the inverter 90 goes high and the output thereof goes low. This causes the number 3 input of the NAND gate 92 to go low and the output of the NAND gate remains high so that one-shot 94 and NAND gate 70 are inactive. However, at the 3-2 shift point the number 1 input of the NAND gate 96 goes high and the number 2 input is already set high by the feedback signal Q2. Accordingly, the output of the NAND gate 96 goes low and the one-shot 98 produces an output pulse 228 which represents a downshift signal event. The output pulse from the one-shot is applied to the number 2 input of the NAND gate 72 which produces an output pulse 230 representing the downshift signal event. This signal is propagated through the signal converter 74 and the up/down counter 76 to the decoder 78 which is decremented by one. Accordingly, the transmission is shifted to the second speed range. As the vehicle is operated in the second speed range with decreasing speed the 2-1 shift point will be reached. At this time the NAND gate 72 will produce an output pulse 232 which represents another downshift signal event. This places the logic circuits in essentially the same state as they were in the start-up condition, as shown in FIG. 20.

After the downshift of the transmission to the first speed range in the shift cycle represented in FIG. 20, the operator manually positions the selector switch to second speed range. This produces a low output on output 2" which is applied to the number 2 input of the upshift NAND gate 92. As shown in FIG. 20 this is the only effect of placing the selector switch in position for the second speed range. With the transmission in the first speed range, the speed increases to the 1-2 shift point. Through the action of shift signal channel 60a (see FIG. 6) the NAND gate 70 produces an upshift signal event 234 which is propagated through the signal converter 74 and the up/down counter 76 to the decoder 78 with attendant changes as indicated in FIG. 20. This causes the transmission to be shifted into second speed range. With the vehicle operated in the second speed range, the speed increases to the 2-3 shift point, as shown in FIG. 20. At this point the input to the inverter 90 goes low and the output goes high. However, the number 2 input of the upshift NAND gate 92 is low because the selector switch is positioned for the second range at 2 and the output 2" is low. This is an upshift inhibit signal and causes the one-shot 94 and the NAND gate 70 to remain inactive. Accordingly, the transmission remains in second speed range. The vehicle can continue to accelerate up to a point where the engine reaches the governed speed as indicated on the chart of FIG. 3. After this vehicle speed is attained, the selector swich is moved to a higher speed range, for example, speed range 5, which removes the upshift inhibit signal from the number 2 input of the NAND gate 92. Accordingly, the output of the NAND gate 92 goes low and the one-shot 94 produces an output pulse 236 which represents an upshift signal event. This causes NAND gate 70 to produce a pulse 238 representing the upshift signal event. This signal event is propagated through the signal converter 74 and the up/down counter 76 to the decoder 78 which is incremented by one. Accordingly, the transmission is shifted into third speed range.

With the vehicle operated in a given speed range, for example third speed range, the operator may actuate the manual inhibit switch 58 (See FIG. 7). This causes the track and hold amplifier 22 to maintain the speed signal voltage output at a constant value equal to that which existed when the switch was actuated. Accordingly, the shift signal generating means 18 will operate as though the vehicle speed remains at a constant value. In fact, the speed of the vehicle may be increased up to the governed speed for the third speed range which is above the 3-4 upshift point. When the inhibit switch 58 is opened with the vehicle speed at this value, the shift signal generating means will produce an upshift signal event and the transmission will be shifted into fourth speed range. On the other hand, if instead of increasing the vehicle speed while in third speed range it is allowed to decrease for example to a value below the 2-1 downshift point and then the manual inhibit switch 58 is opened, the transmission will be downshifted to first range. In this case, the command signal produced by the decoder 78 will be decremented as fast as the speed signal voltage decreases from the hold value to the value below the 2-1 downshift point. Thus, there will be a downshift signal event for the 3-2 shift point followed immediately by a downshift signal event for the 2-1 downshift point. However, the actual shifting of the transmission cannot occur in the time period corresponding to the short duration of the 3-2 downshift signal. Therefore, the transmission will be actually shifted directly from the third speed range down to the first speed range even though the command signal changes by only one step at a time, as is required by the feedback loops from the decoder to the shift signal channels.

The operation of the speed range control circuit 30 and the manual function selector means 28 and the coaction with the automatic shifting means has already been described.

Although the description of this invention has been given with reference to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A control system for an automatic transmission of a vehicle, said transmission having input and output shafts, a plurality of selectable drive ratios between the input and output shafts and including shifting means for changing the drive ratio, a speed signal generating means coupled with the transmission for producing a speed signal having a value corresponding to the speed of the output shaft, a shift signal generating means responsive to the speed signal for producing an upshift signal event at the upper end of each of plural speed ranges of said output shaft and a downshift signal event at the lower end of each speed range, counting means connected with the shift signal generating means and responsive to the number and sense of the upshift and downshift signal events for producing a command signal having a value corresponding to the speed range, and speed range control means connected with the counting means and responsive to said command signal for controlling said shifting means in accordance with the command signal.

2. The invention as defined in claim 1 including feedback means connected from the output of the counting means to the input of the shift signal generating means for inhibiting the generation of an upshift signal event for all speed ranges except the one immediately above the existing speed range and for inhibiting a downshift signal event for all speed ranges except the one immediately below the existing speed range.

3. The invention as defined in claim 1 including a manual selector means for manual selection of the highest desired drive ratio and being connected with said shift signal generating means for inhibiting the generation of an upshift signal event for all speed ranges above the selected speed range.

4. The invention as defined in claim 3 including manually actuated inhibit means connected with said speed signal generating means for preventing said speed signal from increasing to the value required for producing an upshift signal event at the upper end of the speed range in which it is actuated whereby said transmission will not upshift for the duration of said inhibit signal.

5. The invention as defined in claim 1 wherein said automatic transmission includes a torque converter, lockup means connected with said torque converter and lockup actuating means connected with said lockup means and responsive to said speed signal for producing lockup of said torque converter in a predetermined one of said speed ranges.

6. The invention as defined in claim 5 including dropout signal generating means connected with said shift signal generating means and being responsive to each upshift and downshift signal event in all ranges above said predetermined range for producing a dropout signal event, said lockup actuating means being responsive to said dropout signal event for causing dropout of said lockup means during upshift and downshift of the transmission.

7. The invention as defined in claim 1 wherein adjacent speed ranges are joined by transition zones bounded by an upshift point and a downshift point.

8. A control system for an automatic transmission of a vehicle, said transmission having input and output shafts and a plurality of selectable drive ratios between the input and output shafts and including shifting means for changing the drive ratio, a speed signal generating means coupled with the transmission for producing a speed signal having a value corresponding to the speed of the output shaft, a shift signal generating means including a plurality of shift signal channels corresponding to a plurality of different speed ranges with adjacent ranges joined by transition zones bounded by an upshift point and a downshift point, each of said channels including level detecting means responsive to said speed signal for producing a speed logic signal which changes from a first logic state to a second logic state at the upshift point of the respective channel and which changes from the second logic state to the first logic state at the downshift point of the respective channel, each of said channels also including an upshift signal circuit and a downshift signal circuit connected with the respective level detecting means and responsive to said speed logic signal for producing upshift and downshift signal events at said upshift and downshift points respectively, counting means connected with all of said shift signal channels and responsive to said upshift and downshift signal events for producing a command signal corresponding to the difference between the count of upshift and downshift signal events, feedback means connected from the output of said counting means to the inputs of said upshift and downshift signal circuits for inhibiting generation of upshift and downshift signal events for all speed ranges except the ones immediately above and below the speed range corresponding to said command signal, and speed range control means connected with said counting means and responsive to said command signal for controlling said shifting means in accordance with said command signal.

9. The invention as defined in claim 8 wherein said counting means includes upshift signal and downshift signal gate means, an up/down counter, and a decoder connected with the counting means and having a parallel output for producing a plural-bit logic control signal having an output bit associated with each channel for controlling said shifting means in accordance with said command signal.

10. The invention as defined in claim 9 wherein each of said level detecting means comprises a comparator with preset trigger points and requiring a higher input voltage for switching in response to an increasing input than for a decreasing input whereby said upshift signal event occurs at a higher speed than the downshift signal event.

11. The invention as defined in claim 10 wherein said comparator includes positive feedback for providing switching hysteresis to establish said preset trigger points.

12. The invention as defined in claim 11 wherein said upshift signal circuit comprises an upshift logic gate having plural inputs and wherein said downshift signal circuit comprises a downshift logic gate having plural inputs, the output of the comparator being connected with an input of one of the logic gates, an inverter means connected between the output of said comparator and an input of the other of said logic gates, said upshift logic gate having an input connected with the output of the decoder corresponding to the next lower speed range and said downshift logic gate having an input connected with the output of the decoder corresponding to the next higher speed range.

13. The invention as defined in claim 12 including a manual selector switch for manual selection of a speed range and being connected with an input of said upshift logic gate for inhibiting the generation of an upshift signal event for all speed ranges above the selected speed range.

14. The invention as defined in claim 13 wherein said upshift signal circuit comprises a one-shot multivibrator connected with the output of said upshift logic gate and wherein said downshift signal circuit comprises a one-shot multivibrator connected with the output of said downshift logic gate whereby said upshift and downshift signal events comprise pulses of predetermined duration.

15. The invention as defined in claim 14 wherein said speed range counting means comprises an upshift NAND gate having plural inputs and a downshift NAND gate having plural inputs, the upshift one-shot multivibrator in all channels being connected with respective inputs of the upshift NAND gate and the downshift one-shot multivibrators of all channels being connected with respective inputs of the downshift NAND gate.

16. The invention as defined in claim 15 including a signal converter connected with the outputs of the upshift and downshift NAND gates, said converter having a first output producing a clock pulse for each output pulse of the NAND gates and having another output for producing a logic signal of a first state for each upshift signal event and a logic signal of a second state for each downshift signal event, the outputs of said signal converter being connected with the inputs of said up/down counter.

17. The invention as defined in claim 8 including manually actuated inhibit means connected with said speed signal generating means for preventing said speed signal from increasing to the value corresponding to the next higher upshift point whereby said transmission will not upshift for the duration of said inhibit signal.

18. The invention as defined in claim 17 wherein said speed signal generating means includes a transducer connected with an output shaft of said transmission for producing a signal corresponding to speed of said shaft, circuit means connected with the transducer for producing a speed signal, amplifying means having a signal input connected with said circuit means, manually actuated inhibit means, said amplifying means having a hold input connected with said inhibit means, whereby actuation of the inhibit means prevents the output of said amplifying means from changing.

19. The invention as defined in claim 8 wherein said automatic transmission includes a torque converter, said control system including a lockup logic gate coupled with the shift signal generating means, lockup actuating means connected with said lockup gate and responsive to the output thereof for causing the lockup of said torque converter in a predetermined speed range.

20. The invention as defined in claim 8 wherein said automatic transmission includes a torque converter, said control system including a lockup comparator having an input connected with said speed signal generating means and adapted to produce a lockup logic signal which changes from a first logic state to a second logic state at a first speed within a selected one of the speed ranges and which changes from the second logic state to the first logic state at a lower speed within said selected one of the speed ranges, a lockup logic gate having one input connected with the output of said comparator, a one-shot multivibrator having an input coupled with the outputs of said upshift and downshift signal circuits for producing an unlock signal pulse during each shift signal event, the output of said one-shot multivibrator being connected with another input of said lockup gate, and lockup actuating means connected with said lockup gate and responsive to said output signal for controlling the lockup of said torque converter.

21. The invention as defined in claim 8 wherein said transmission includes a reverse drive means, a reverse selection channel including a logic gate for producing a reverse control signal, a reverse shifting means connected with the reverse selection channel for actuating the reverse drive means, a manually actuated reverse switch connected with one input of the logic gate to cause the gate to produce a reverse control signal, said counting means being coupled with another input of the logic gate to inhibit the reverse control signal unless the transmission is in a predetermined ratio.

22. The invention as defined in claim 21 wherein the shift signal channel associated with said predetermined ratio includes an upshift circuit, said reverse switch being connected with the upshift circuit for preventing upshift of said drive ratio when the reverse drive is selected.

23. The invention as defined in claim 8 wherein said transmission includes neutral, a neutral selection channel including a neutral logic gate for producing a neutral control signal, a neutral shifting means connected with the neutral selection channel for placing the transmission in neutral, a manually actuated neutral switch connected with one input of the neutral logic gate to cause the gate to produce a neutral control signal, said counting means being coupled with another input of the neutral logic gate to inhibit the neutral control signal unless the transmission is in a predetermined ratio.

24. The invention as defined in claim 23 wherein said neutral shifting means includes a neutral solenoid which is deenergized for placing the transmission in neutral and which is energized for taking the transmission out of neutral, a starter interlock circuit for enabling a starter means, said starter interlock circuit being connected with the output of said neutral logic gate and being enabled when the neutral solenoid is deenergized.

25. The invention as defined in claim 8 wherein said transmission includes a low-low drive means, a low-low selection channel including a logic gate for producing a low-low control channel, a low-low shifting means connected with the low-low selection channel for actuating the low-low drive means, a manually actuated low-low switch connected with one input of the low-low logic gate to cause the gate to produce a low-low control signal, said counting means being coupled with another input of the low-low logic gate to inhibit the low-low control signal unless the transmission is in a predetermined ratio.

26. The invention as defined in claim 9 wherein said speed range control means includes plural solenoids for said shifting means, the number of solenoids being less than the number of gear ratios to be activated, a solenoid logic gate associated with each of said solenoids, power amplifying means connected between each solenoid logic gate and the associated solenoid for selective energization of the solenoids, at least two outputs of the decoder connected with the inputs of each solenoid logic gate for energizing different combinations of said solenoids to select a gear ratio in accordance with said command signal from said decoder.

27. The invention as defined in claim 26 including an additional solenoid, an additional logic gate associated with the additional solenoid, power amplifying means connected between the additional logic gate and the additional solenoid, and selected outputs of said decoder being connected with the inputs of said additional logic gate.

28. The invention as defined in claim 27 wherein each of said plural solenoid logic gates comprises a flip-flop with the outputs of said decoder being connected with the set and reset inputs of the flip-flop and wherein said additional logic gate is a NOR gate.

29. A control system for an automatic transmission of a vehicle, said transmission having input and output shafts and including shifting means for changing the drive ratio of said transmission to provide plural different speed ranges of said output shaft, a speed signal generating means coupled with one of said shafts of the transmission for producing a speed signal, a shift signal generating means connected with the speed signal generating means and responsive to the speed signal for producing an upshift signal event at the upper end of each of said plural speed ranges and a downshift signal event at the lower end of each of said speed ranges, counting means connected with the shift signal generating means and responsive to the number and sense of the upshift and downshift signal events for producing a command signal having a value corresponding to the speed range, and speed range control means connected with the counting means and responsive to said command signal for controlling the shifting means in accordance with the command signal.

* * * * *